(12) United States Patent
Coles

(10) Patent No.: US 8,935,932 B2
(45) Date of Patent: Jan. 20, 2015

(54) VAPOUR ABSORPTION REFRIGERATION

(75) Inventor: Peter David Coles, London (GB)

(73) Assignee: Sunengen Limited, Dublin (IE)

( * ) Notice: Subject to any disclaimer, the term of this patent is extended or adjusted under 35 U.S.C. 154(b) by 33 days.

(21) Appl. No.: 13/876,710

(22) PCT Filed: Sep. 29, 2011

(86) PCT No.: PCT/IB2011/054291
§ 371 (c)(1),
(2), (4) Date: Jun. 19, 2013

(87) PCT Pub. No.: WO2012/042496
PCT Pub. Date: Apr. 5, 2012

(65) Prior Publication Data
US 2013/0269375 A1    Oct. 17, 2013

(30) Foreign Application Priority Data

Sep. 29, 2010  (ZA) ................................ 2010/06942

(51) Int. Cl.
*F25B 15/00* (2006.01)
*F25B 15/04* (2006.01)

(52) U.S. Cl.
CPC ............... *F25B 15/00* (2013.01); *F25B 15/008* (2013.01); *F25B 15/04* (2013.01); *Y02B 30/62* (2013.01)
USPC ..................... 62/112; 62/101; 62/109; 62/476

(58) Field of Classification Search
USPC .................................... 62/112, 109, 101, 476
See application file for complete search history.

(56) References Cited

U.S. PATENT DOCUMENTS

| 2,195,375 | A | 3/1940 | Adams |
| 5,205,137 | A | 4/1993 | Ohuchi et al. |

FOREIGN PATENT DOCUMENTS

DE    10 2004 056484 A1    5/2006

*Primary Examiner* — Cassey D Bauer

(57) ABSTRACT

The invention relates to vapor absorption refrigeration. The invention provides methods for carrying out vapor absorption refrigeration, and a vapor absorption refrigeration installation. The invention provides also a method for operating an absorption stage of a vapor absorption refrigeration system and an absorption stage installation for a vapor absorption refrigeration installation.

13 Claims, 1 Drawing Sheet

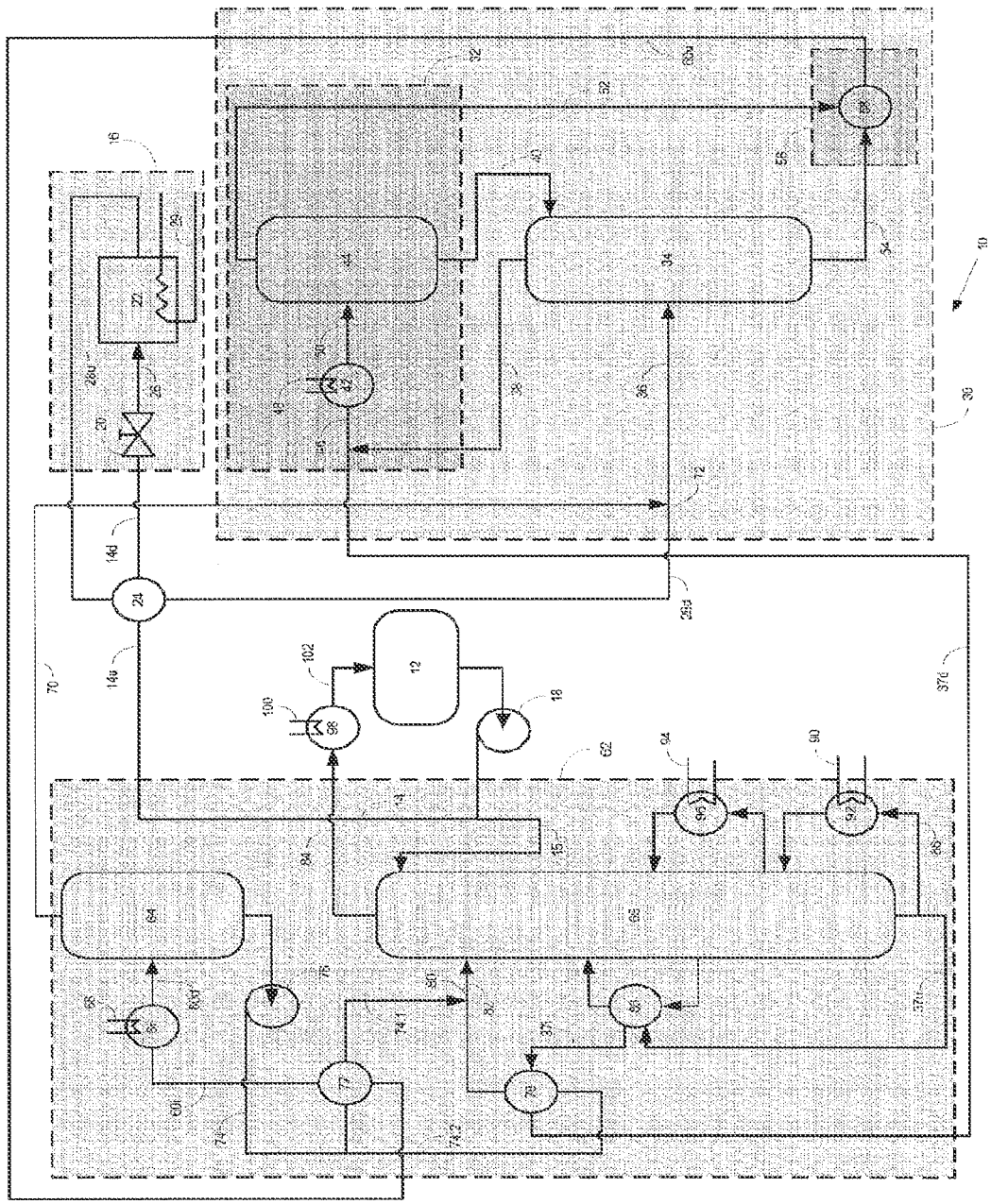

VAPOUR ABSORPTION REFRIGERATION

CROSS-REFERENCE TO RELATED APPLICATIONS

This patent application is a national stage of International Patent Application No. PCT/IB2011/054291, filed Sep. 29, 2011, which claims priority to South African Patent Application No. 2010/06942, filed Sep. 29, 2010, both of which are incorporated by reference in their entireties.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM

EFS-Web

Not Applicable.

STATEMENT REGARDING PRIOR DISCLOSURES BY THE INVENTOR OR A JOINT INVENTOR

Not Applicable,

BACKGROUND OF THE INVENTION

1. Field of the Invention

The invention relates to refrigeration. More particularly, the invention relates to vapour absorption refrigeration.

2. Description of Related Art

The invention provides a method of carrying out vapour absorption refrigeration, and a vapour absorption refrigeration installation. The invention provides also a method for operating an absorption stage of a vapour absorption refrigeration system and an absorption stage installation for a vapour absorption refrigeration installation.

One of two main heat transfer regimes is generally employed in refrigeration, namely vapour compression or vapour absorption. The present invention is concerned with the latter.

Both vapour compression and vapour absorption refrigeration cycles operate, generally speaking, on the basis of an inverse Rankine or inverse Carnot cycle. This involves, sequentially, (i) increasing the pressure of a gaseous refrigerant in a compression stage, (ii) condensing the refrigerant at constant pressure to liquefy the refrigerant, thereby reducing the heat capacity of the refrigerant, (iii) reducing the pressure either across a valve or through an expansion turbine to obtain partially evaporated refrigerant, and (iv) further evaporating the refrigerant by bringing it into a heat transfer relationship with a heat transfer medium, such as air, water or other fluids, that is at a higher temperature and is thus cooled through heat exchange with the refrigerant. Thereafter, the evaporated refrigerant passes back to the compression stage and the cycle is repeated. The heat transfer medium is cooled down or refrigerated.

A major difference between vapour compression and vapour absorption cycles is the manner in which the pressure of the refrigerant is increased. In a vapour compression refrigeration cycle, compression is achieved mechanically by means of a compressor, which constitutes the main work input requirement to the vapour compression refrigeration system. In a vapour absorption refrigeration cycle, however, the compressor is replaced by (i) an absorber, in which evaporated refrigerant is contacted with an absorbent, being a liquid, (ii) a pump which passes the refrigerant-enriched absorbent from the absorber to (iii) a generator or regenerator column, in which the refrigerant is fractionated out of the refrigerant-enriched absorbent and from which refrigerant-enriched vapour then exits as an overhead product at a high enough pressure to be condensed in a condenser.

From the brief exposition above, it follows that the work input to a vapour absorption refrigeration cycle or system comprises the work required to operate the circulating pump(s) and the work, or heat, required to evaporate and thus recover the refrigerant from the refrigerant-enriched absorbent. In a vapour absorption refrigeration system, it is therefore desirous to reduce the required work input to the system for providing a particular cooling effect, thereby to increase the coefficient of performance.

A number of factors impact on the coefficient of performance which is achievable by a vapour absorption refrigeration system. One such factor is the achievable regenerator overhead temperature, i.e. the temperature of the refrigerant leaving the regenerator. This temperature determines the operating pressure of the system and has a significant impact on the coefficient of performance, as an increased temperature requires that a greater fraction of chilling duty needs to be spent in cooling the refrigerant to the desired evaporation temperature.

Another factor that affects efficiency is the purity of the refrigerant that is recovered in the regenerator overhead product. This would impact particularly on the efficiency of the evaporator. More particularly, any absorbent contained in the overhead product would require some of the chilling duty to be expended on chilling the absorbent, rather than the refrigerant.

Yet a further limitation to efficient operation of vapour absorption refrigeration systems is the bottoms equilibrium temperature of the absorber, i.e. the temperature of the refrigerant-enriched absorbent. This temperature affects the pressure at which the generator must be operated, considering the vapour pressure of the refrigerant-enriched absorbent at the temperature at which it exits the absorber. More specifically, a higher absorber exit temperature would require a higher ratio of absorbent to refrigerant, thus increasing the required heat input to the regenerator.

What is also noteworthy is that absorption refrigeration systems typically operate by dissolving (i.e. absorbing) the refrigerant, for example ammonia, vapourised in the evaporator, at low pressure in solvent, e.g. water, and then separating the refrigerant, e.g. ammonia, from the water by distillation. The distillation pressure has to be high enough for the separated refrigerant to be capable of being condensed in the condenser at a temperature that is achievable with available cooling media. The consequence of this principle is that large quantities of solvent, e.g. water, are being heated up and cooled at temperatures where this heat input cannot be recovered and since, for example, water has a high latent heat of vapourisation the heat rejection tends to be high. With the compression refrigeration system, the only circulating fluid is refrigerant e.g. ammonia so that the heat load associated with circulating solvent e.g. water through the system, which is the case in absorption refrigeration systems, is avoided.

The present invention therefore seeks to reduce the amount of heat input required to carry out vapour absorption refrigeration whilst addressing the abovementioned process limitations, thereby to increase the coefficient of performance thereof.

In accordance with one aspect of the invention, there is provided a method of carrying out vapour absorption refrigeration, the method including in a condensing stage, condensing a refrigerant in vapour form to obtain condensed or liquefied refrigerant;

passing this liquefied refrigerant into an expansion/evaporation stage;

in the expansion/evaporation stage, subjecting the refrigerant to heat transfer against a higher temperature medium such that heat is transferred from the higher temperature medium to the refrigerant, with the higher temperature medium being cooled and the refrigerant being heated such that at least some of the liquefied refrigerant is evaporated, thereby to obtain vapourised refrigerant;

passing the vapourised refrigerant from the evaporation stage into an absorption stage;

absorbing, in the absorption stage, some of the vapourised refrigerant into an absorbent at a first pressure thereby to obtain partially refrigerant-enriched absorbent;

contacting, in a compression absorption stage, the partially refrigerant-enriched absorbent with vapourised refrigerant under compression at a second pressure that is greater than the first pressure, thereby absorbing vapourised refrigerant into the partially refrigerant-enriched absorbent and obtaining refrigerant-enriched absorbent;

passing refrigerant-enriched absorbent from the compression absorption stage into a refrigerant regeneration stage;

in the regeneration stage, recovering refrigerant, in vapour form, from the refrigerant-enriched absorbent thereby to obtain refrigerant-depleted absorbent;

recycling recovered vapourised refrigerant from the regeneration stage to the condensing stage; and recycling refrigerant-depleted absorbent from the regeneration stage to the absorption stage, with this refrigerant-depleted absorbent constituting the absorbent in the absorption stage.

By "higher temperature medium" there is meant a medium that is at a higher temperature than the refrigerant when the refrigerant enters the evaporator. The refrigerant can therefore be regarded as entering the expansion/evaporation stage at a temperature T1, being brought into a heat transfer relationship with the higher temperature medium at a temperature T2, with T1 being greater than T2.

It is also to be noted that, in the compression absorption stage, additional vapourised refrigerant is absorbed into the absorbent (being constituted by the partially refrigerant-enriched absorbent) to vapourised absorbent that had been absorbed into the absorbent in the absorption stage (in forming the partially refrigerant-enriched absorbent).

The absorbing of the vapourised refrigerant into the refrigerant-depleted absorbent in the absorption stage may include contacting, in a pre-contacting stage, vapourised refrigerant with the refrigerant-depleted absorbent to obtain partially refrigerant-saturated absorbent; and contacting, in a main contacting stage, vapourised refrigerant with the partially refrigerant-saturated absorbent, thereby to obtain the partially refrigerant-enriched absorbent.

More specifically, the pre-contacting stage may be a pre-saturation stage while the main contacting stage may be a pre-absorption stage. The process may then include Passing vapourised refrigerant from the evaporation stage into the pre-absorption stage;

in the pre-absorption stage, absorbing vapourised refrigerant into an absorption liquid from the pre-saturation stage;

withdrawing unabsorbed vapourised refrigerant from the pre-absorption stage and passing it into the pre-saturation stage together with the refrigerant-depleted absorbent from the regeneration stage, with the refrigerant-depleted absorbent thus being pre-contacted and partially saturated with the vapourised refrigerant in the pre-saturation stage, thereby to obtain the partially refrigerant-saturated absorbent; and withdrawing the partially refrigerant-saturated absorbent from the pre-saturation stage and passing it into the pre-absorption stage so that it constitutes the absorption liquid in the pre-absorption stage.

The method may include, in the pre-saturation stage, cooling the unabsorbed vapourised refrigerant and the refrigerant-depleted absorbent.

The pre-saturation stage and the pre-absorption stage may be operated at a pressure, being the first pressure, of between about 1.3 bar (abs) and about 4.5 bar (abs).

Subjecting the partially refrigerant-enriched absorbent and vapourised refrigerant to compression absorption in the compression absorption stage may include withdrawing residual vapourised refrigerant from the pre-saturation stage;

withdrawing partially refrigerant-enriched absorbent from the pre-absorption stage;

passing the residual vapourised refrigerant from the pre-saturation stage and the partially refrigerant-enriched absorbent from the pre-absorption stage into the compression absorption stage in which the residual vapourised refrigerant is contacted with the partially refrigerant-enriched absorbent under increased pressure, thereby forming the refrigerant-enriched absorbent which is passed to the refrigerant regeneration stage.

Subjecting the partially refrigerant-enriched absorbent and residual vapourised refrigerant to compression absorption in the compression absorption stage may, in particular, be achieved by means of a compressor. Such a compressor may, in particular, comprise a liquid ring pump, with the partially refrigerant-enriched absorbent and residual vapourised refrigerant being passed to the suction side of the liquid ring pump and the refrigerant-enriched absorbent being withdrawn or discharged from the pressure side of the liquid ring pump. It is nonetheless expected that other types of compressors would also be suitable in carrying out compression absorption in the compression absorption stage, including but not limited to Archimedes screw-type compressors and vaneless impeller compressors. The invention is thus not limited to the employment of a liquid ring pump.

The residual vapourised refrigerant may be re-contacted with the partially refrigerant-enriched absorbent in the compression absorption stage at a pressure, being the second pressure, more particularly the discharge pressure of the pump, of between about 3.5 bar (abs) and about 10 bar (abs).

Contacting the refrigerant-depleted absorbent with the unabsorbed vapourised refrigerant in the pre-saturation stage may include subjecting the so contacted refrigerant-depleted absorbent and unabsorbed vapourised refrigerant to cooling heat transfer. Preferably, the contacting of the refrigerant-depleted absorbent with the unabsorbed vapourised refrigerant and the subjecting of the so contacted refrigerant-depleted absorbent and unabsorbed vapourised refrigerant to cooling heat transfer is effected simultaneously such that simultaneous mass transfer of unabsorbed vapourised refrigerant to refrigerant-depleted absorbent, and cooling heat transfer occurs.

In one embodiment of the invention, for a desired refrigeration temperature of between about 5° C. and about −30° C., the refrigerant may be condensed, in the condensing stage, to a condensed temperature of between 5° C. and 60° C. at a condensing pressure substantially equal to a regeneration stage operating pressure of between 5.5 bar (abs) and 25 bar (abs) by heat exchanging the recovered vapourised refrigerant from the regeneration stage against a coolant medium. The condensed refrigerant may then be supplied to the expansion/evaporation stage at a first pressure of between 6 bar (abs) and 26 bar (abs) and is then expanded or throttled in the expansion/evaporation stage to a second pressure of between 4.5 bar (abs) and 1.3 bar (abs), being substantially equal to the vapour pressure of the refrigerant for the desired refrigeration temperature. The condensed refrigerant may optionally be cooled to a temperature of between 34° C. and 0° C. by heat exchanging the condensed refrigerant against evaporated refrigerant from the expansion/evaporation stage prior to supplying the condensed refrigerant to the expansion/evaporation stage. The evaporated refrigerant may be supplied to the pre-absorption stage and the unabsorbed evaporated refrigerant to the pre-saturation stage at the second pressure and at a temperature of between 30° C. and 5° C. The refrigerant depleted absorbent from the regeneration stage may be fed to the pre-saturation stage at a temperature of between 10° C. and 60° C. and a pressure of between 2.0 bar (abs) and 5 bar (abs). The residual evaporated refrigerant may be subjected to compression absorption into the partially refrigerant enriched absorbent at a discharge pressure, being the second pressure, of between and 3.5 bar (abs) and 10.0 bar (abs). The refrigerant enriched absorbent may be fed to the regeneration stage at a temperature of between 5° C. and 70° C. Finally, the refrigerant may be evaporated out of and thus recovered from the absorbent, in the regeneration stage, at a temperature at the bottom of the regenerator of between 135° C. and 220° C. and at a pressure of between 5.5 bar (abs) and 25 bar (abs).

As has been alluded to above, the method may include, in the expansion/evaporation stage, and prior to subjecting the refrigerant to heat transfer with the higher temperature medium, expanding the condensed refrigerant across an expansion valve or mechanical turbine, thereby to obtain a mixture of liquefied refrigerant and vapourised refrigerant prior to subjecting the refrigerant to heat transfer against the higher temperature medium. The refrigerant mixture may then be subjected to heat transfer against another higher temperature medium, which may be refrigerant.

The refrigerant may, in particular, be ammonia. It is envisaged that the refrigerant may however, instead, be selected from a range of suitable refrigerants capable of being absorbed and thermally regenerated.

The absorbent may be a liquid having a higher boiling point than the refrigerant. The absorbent may, in particular, be water. It is envisaged that the refrigerant may however, instead, be selected from a range of suitable absorbents capable of absorbing refrigerants and being thermally regenerated.

As also indicated above, the refrigerant may be supplied to the condensing stage at a pressure that is substantially equal to the regeneration stage operating pressure.

The method may include supplying a cooling medium, typically air and/or cooling water, to the condensing stage to condense the refrigerant vapour. Preferably, the method includes supplying cooling medium to the condensing stage at a temperature and a flow rate sufficient to attain a condensing stage heat transfer duty which is, in turn, sufficient to condense substantially all the refrigerant passed to the condensing stage from the regeneration stage by cooling, at substantially constant pressure, the recovered refrigerant from a recovered refrigerant regeneration stage outlet temperature to a desired condensed temperature for the outlet pressure, which temperature may typically be about 35° C.

The method may further include accumulating condensed refrigerant in a condensed refrigerant accumulating stage. Typically, the accumulating stage may be at ambient temperature and at a pressure high enough to maintain the refrigerant in the liquid phase. In such an embodiment, the method may include supplying condensed refrigerant from the accumulating stage to the expansion/evaporation stage, more particularly to the expansion valve or expansion turbine, at a selected pressure, typically by generating a selected pressure head by means of a condensed refrigerant accumulating stage pump. The selected pressure may, preferably, be such that after expansion of the condensed refrigerant across the expansion stage an expanded pressure of the refrigerant will be substantially equal to the vapour pressure of the refrigerant for a desired refrigeration temperature, as quantified above.

In one embodiment of the invention, a condensed refrigerant stream is withdrawn from the accumulation stage and is refluxed to the regeneration stage.

The method may also include, prior to passing the condensed refrigerant to and expanding the condensed refrigerant across the expansion stage, thus upstream of the expansion stage, subjecting the condensed refrigerant to cooling heat transfer. Preferably, the condensed refrigerant is subjected to cooling heat transfer with the vapourised refrigerant which exits the evaporator.

In the evaporation stage, the refrigerant may be heat exchanged against the higher temperature medium which is desired to be cooled to approach or approximate to the evaporation stage operating temperature, i.e. the refrigerant saturation temperature at the evaporation stage operating pressure. Energy, in the form of heat, may therefore be exchanged, in the evaporation stage, between the higher temperature medium and the refrigerant, typically at the refrigerant saturation temperature thereby to vapourise substantially all the refrigerant and bring the evaporator substantially to the refrigerant saturation temperature, as quantified above.

The method may thus include operating the evaporation stage at a pressure substantially equal to the vapour pressure of the refrigerant at the desired refrigeration temperature. Thus, the vapourised refrigerant may be withdrawn from the evaporation stage at a substantially saturated condition with regards temperature, pressure and entropy.

Passing the vapourised refrigerant to the absorption stage, and more particularly to the pre-absorption stage, may therefore be carried out at a pressure substantially equal to, or typically slightly less than, the evaporator operating pressure. The method may therefore include operating the pre-absorption stage, and possibly also the pre-saturation stage, at a first absorption stage pressure which is substantially equal to, or slightly less than, the evaporation stage refrigerant operating pressure. It will be appreciated that when the vapourised refrigerant is heat exchanged against the condensed refrigerant upstream of the evaporation stage as hereinbefore described, the vapourised refrigerant will no longer be at the evaporator operating temperature.

Absorbing vapourised refrigerant into the absorption liquid in the pre-absorption stage may be carried out in a counter-current fashion, typically by means of a pre-absorption stage flash vessel into which the absorbing liquid from the pre-saturation stage is introduced operatively from the top of the flash vessel, whilst vapourised refrigerant is introduced operatively from the bottom of the flash vessel. Partially refrigerant-enriched absorbing liquid is thus obtained at the bottom of the flash vessel and unabsorbed vapourised refrigerant at the top of the flash vessel. The flash vessel may have suitable internal components for the disengagement of liquid and vapour as required by the process.

Absorbing vapourised refrigerant, typically unabsorbed vapourised refrigerant from the pre-absorption stage, may also be carried out, in part, in a flash vessel, also having suitable internal components for the disengagement of liquid and vapour as required by the process.

As alluded to above, the method may include removing heat from the absorption stage, more desirably from the pre-saturation stage, by means of cooling heat transfer. More particularly, the method may include, in a pre-saturation heat transfer operation, subjecting the unabsorbed vapourised refrigerant obtained from the pre-absorption stage and the refrigerant-depleted absorbent obtained from the regenerator stage to cooling heat transfer against a pre-saturation stage cooling medium in a pre-saturation stage heat exchanger, typically after the unabsorbed vapourised refrigerant and the refrigerant-depleted absorbent have been or whilst they are being so contacted or admixed. Such contacting or admixture can thus, in part, take place in the heat exchanger or can take place upstream therefrom. The method may include supplying the pre-saturation stage cooling medium to the pre-saturation heat transfer operation at a temperature and pressure to achieve a heat transfer duty which is sufficient to cool the unabsorbed vapourised refrigerant and the refrigerant-depleted absorbent, more particularly the mixture thereof, to a desired pre-saturator inlet temperature, typically about 35° C. The pre-saturator heat transfer operation may be conducted separately from the pre-saturator flash vessel, typically upstream therefrom and at or downstream of a mixing point at which the unabsorbed vapourised refrigerant and the refrigerant-depleted absorbent are contacted or admixed. As envisaged above, the mixing point may thus be at the pre-saturator heat transfer operation. Alternatively, the pre-saturator heat transfer operation forms part of the pre-saturator flash vessel, such that pre-saturation of the refrigerant-depleted absorbent from the regeneration stage with the unabsorbed vapourised refrigerant from the pre-absorption stage is carried out in the pre-saturation stage flash vessel with simultaneous cooling heat exchange and absorption (i.e. mass transfer). Holistically regarded, the pre-saturation stage may therefore involve simultaneous cooling (i.e. heat transfer) and absorption of refrigerant in refrigerant-depleted absorbent (i.e. mass transfer).

Contacting residual vapourised refrigerant from the pre-saturation stage with partially enriched absorbent from the pre-absorption stage in the compression absorption stage may include, as indicated above, the use of a liquid ring pump, with the compression absorption stage thus comprising a so called 'liquid ring' pump stage. The method may thus include centrifugally dispersing the partially enriched absorbent from the pre-absorption stage as a liquid ring in the liquid ring pump or liquid ring pump stage and introducing the residual vapourised refrigerant from the pre-saturation stage into the eye of the liquid ring, with the residual vapourised refrigerant thereby being absorbed into the partially enriched absorbent under increased pressure between vanes of an impeller of the liquid ring pump as these vanes intrude into the liquid ring. It will be appreciated that the pressure under which absorption is carried out in the compression absorption stage is higher than the operating pressure of the pre-absorption and pre-saturation stages and thus also higher than the operating pressure of the evaporation stage. This pressure has already been quantified above. As has also already been stated above, the liquid ring pump, although preferred, is not to be regarded as being exclusive in relation to the present invention as it is expected that other types of compressors could also, possibly, be employed.

The method may further include accumulating the refrigerant-enriched absorbent in a refrigerant-enriched absorbent accumulation stage upstream of the regeneration stage. Accumulation of the refrigerant-enriched absorbent in the refrigerant-enriched absorbent accumulation stage may be carried out at ambient temperature and at a pressure high enough to maintain the refrigerant-enriched absorbent in the liquid phase. In such an embodiment, the method may include, upstream of the refrigerant-enriched absorbent accumulation stage, subjecting the refrigerant-enriched absorbent to cooling heat transfer, typically by means of a cooling fluid such as water, to reduce the temperature of the refrigerant-enriched absorbent from an absorption stage exit temperature thereof to typically about 35° C.

When the method includes accumulating the refrigerant-enriched absorbent in the refrigerant-enriched absorbent accumulation stage, the method may also include withdrawing refrigerant-enriched absorbent from the accumulation stage and passing withdrawn refrigerant-enriched absorbent to the regeneration stage at a pressure substantially equal to the operating pressure of the regeneration stage, as has already been quantified above. Typically, in such a case, the refrigerant-enriched absorbent is passed to the regeneration stage by means of a pump which generates a pressure head sufficient to introduce the refrigerant-enriched absorbent into the regenerator substantially at the regenerator operating pressure.

Further, also typically when the method includes accumulating the refrigerant-enriched absorbent in the refrigerant-enriched absorbent accumulation stage, as a means of controlling the pressure in the accumulation stage, the method may further include introducing residual refrigerant vapour from the compression absorption stage into the vapourised refrigerant upstream of the absorption stage, more particularly upstream of the pre-absorption stage of the absorption stage. More particularly, the method may include withdrawing residual refrigerant vapour from a point upstream of the regeneration stage, typically from the refrigerant-enriched absorbent accumulation stage, and combining the withdrawn residual refrigerant vapour with the vapourised refrigerant from the evaporator stage.

The method may also include, typically when the refrigerant-enriched absorbent which exits the compression absorption stage has been subjected to cooling and accumulation, pre-heating at least some of the refrigerant-enriched absorbent prior to feeding the refrigerant-enriched absorbent to the regenerator stage.

Pre-heating the refrigerant-enriched absorbent may be carried out by subjecting at least some of the refrigerant-enriched absorbent to heat transfer, preferably by means of available heat generated by carrying out the method of the invention, i.e. against process streams which may have resulted by carrying out the method of the invention.

More particularly, the method may include, in a first refrigerant-enriched absorbent heat transfer stage, subjecting at least some downstream refrigerant-enriched absorbent to heat transfer with upstream refrigerant-enriched absorbent. Still more particularly, when the method includes accumulating the refrigerant-enriched absorbent in a refrigerant-enriched absorbent accumulation stage as hereinbefore described, the method may include, upstream of the regeneration stage but downstream of the accumulation stage, subjecting at least some accumulated refrigerant-enriched absorbent, which is withdrawn from the accumulation stage, to heat transfer against refrigerant-enriched absorbent which is being fed to the accumulation stage from the absorption stage.

Alternatively, or more preferably additionally, the method may include, in a second refrigerant-enriched absorbent heat transfer stage, subjecting at least some of the refrigerant-enriched absorbent withdrawn from the refrigerant-enriched absorbent accumulation stage to heat transfer with refrigerant-depleted absorbent obtained from the regeneration stage. More particularly, the method may include, when the refrigerant-enriched absorbent is accumulated in the accumulation stage as hereinbefore described, subjecting, upstream of the regeneration stage, at least some of the accumulated refrigerant-enriched absorbent which is withdrawn from the refrigerant-enriched absorbent accumulation stage and passed to the regeneration stage to heat transfer with the refrigerant-depleted absorbent from the regeneration stage.

In a preferred embodiment of the invention, the method includes splitting the refrigerant-enriched absorbent which is withdrawn from the refrigerant-enriched absorbent accumulation stage into first and second stream portions and, upstream of the regeneration stage, subjecting the first stream portion to heat transfer with upstream refrigerant-enriched absorbent and subjecting the second stream portion to heat transfer with refrigerant-depleted absorbent from the regeneration stage. The method may then include, after having been respectively subjected to heat transfer, feeding both the first and second refrigerant-enriched absorbent portions to the regeneration stage. Preferably, the method includes combining the first and second refrigerant-enriched absorbent stream portions upstream of the regeneration stage and feeding the combination of the first and second refrigerant-enriched absorbent stream portions to the regeneration stage. However, the first and second refrigerant-enriched absorbent stream portions can also be fed to the regeneration stage independently.

Recovering refrigerant, in vapour form, in the regeneration stage may include subjecting the refrigerant-enriched absorbent to fractional distillation. More particularly, the method may include, in the regeneration stage, heating the refrigerant-enriched absorbent thereby to evaporate refrigerant out of the refrigerant-enriched absorbent and thereby to obtain the refrigerant-depleted absorbent, in liquid form, and recovered refrigerant, in vapour form.

Heating the refrigerant-enriched absorbent in the regeneration stage may include subjecting the refrigerant-enriched absorbent to heat transfer with a regeneration stage heat transfer medium. Thus, the method may include passing the regeneration stage heat transfer medium in a heat transfer relationship with the regeneration stage, and more particularly with the refrigerant-enriched absorbent in the regeneration stage. In one embodiment of the invention, the method may include, in the regeneration stage, passing at least two separate regeneration stage heat transfer medium streams in a heat transfer relationship with the regeneration stage, and more particularly with the refrigerant-enriched absorbent in the regeneration stage. The regeneration stage heat transfer medium may preferably be heated oil or steam. In a preferred embodiment of the invention, the method includes at least two regeneration heating stages configured as side re-boilers in addition to a main regenerator re-boiler located at the bottom of the column.

The method may also include, additionally to the one or more regeneration heating stages, subjecting the regeneration stage to heat exchange with refrigerant-depleted absorbent withdrawn from the regeneration stage.

The method may also include, in the regeneration stage, refluxing at least some refrigerant-depleted absorbent and subjecting it to heat exchange with a heating medium.

The heating medium may typically be an oil or steam, and may be at a temperature of between about 125° C. and about 275° C.

The cooling medium may typically be water or atmospheric air and may be at a temperature of between about 1° C. and about 50° C.

The refrigerant evaporation temperature, and thus the desired cooling temperature, may typically be between about −30° C. and about 5° C.

The applicant believes that the method of the invention, and particularly the approach suggested to absorbing vapourised refrigerant into refrigerant-depleted absorbent achieves a higher absorption efficiency, resulting in a greater fraction of the refrigerant-enriched absorbent being constituted by absorbed refrigerant. A purer regenerator stage overhead product is thus generated which, in turn, impacts positively on the achievable coefficient of performance by increasing the cooling effect that is achieved in the evaporator. Additionally, the applicant believes that the manner in which the method of the invention manages process heat utilisation allows for energy-efficient operation of a vapour absorption refrigeration system or installation that implements the method, particularly by reducing the required energy input to the system.

In accordance with another aspect of the invention, there is provided an absorption refrigeration installation which includes a condenser in which a refrigerant in vapour form can be condensed, to obtain a condensed or liquefied refrigerant;

an expander/evaporator stage in which the refrigerant can be subjected to heat transfer with a higher temperature medium such that energy in the form of heat is transferred from the higher temperature medium to the refrigerant, with the higher temperature medium being cooled or refrigerated and the refrigerant being vapourised, with a condensed refrigerant transfer line leading from the condenser to the expander/evaporator stage;

an absorption stage in which the heated refrigerant can be absorbed, at a first pressure, into an absorbent to obtain a partially refrigerant-enriched absorbent, with a vapourised refrigerant transfer line leading from the evaporator stage into the absorption stage;

a compression absorption stage in which the partially refrigerant-enriched absorbent can be contacted with vapourised refrigerant at a second pressure that is greater than the first pressure, to obtain refrigerant enriched-absorbent.

a regenerator stage in which refrigerant can be recovered, in vapour form, from the refrigerant-enriched absorbent thereby to obtain a refrigerant-depleted absorbent, with a refrigerant-enriched absorbent transfer line leading into the regenerator stage;

a recovered vapourised refrigerant transfer line leading from the regenerator stage to the condenser and along which recovered refrigerant can be withdrawn from the regenerator stage and passed to the condenser; and a refrigerant-depleted absorbent transfer line leading from the regenerator stage and along which refrigerant-depleted absorbent can be withdrawn from the regenerator stage, with this transfer line leading into the absorption stage so that the refrigerant-depleted absorbent constitutes the absorbent in the absorption stage.

The absorption stage may include a pre-contacting stage in which refrigerant-depleted absorbent can be pre-contacted with vapourised refrigerant to obtain a partially refrigerant-saturated absorbent; and a main contacting stage in which the partially refrigerant-saturated absorbent can be contacted with vapourised refrigerant to obtain a partially refrigerant-enriched absorbent.

More specifically, the pre-contacting stage may comprise a pre-saturator, while the main contacting stage may comprise a pre-absorber stage. The absorption stage may then include the pre-absorber to which vapourised refrigerant can be fed from the evaporator along the vapourised refrigerant transfer line and in which the vapourised refrigerant can be contacted with an absorption liquid from the pre-saturator and into which it can be absorbed to obtain the partially refrigerant-enriched absorbent, with an absorption liquid transfer line leading from the pre-saturator into the pre-absorber;

the pre-saturator to which refrigerant-depleted absorbent can be fed from the regenerator along the refrigerant-depleted absorbent transfer line and in which it can be contacted with unabsorbed vapourised refrigerant from the pre-absorption stage, thereby to pre-saturate the refrigerant-depleted absorbent, with an unabsorbed vapourised refrigerant transfer line leading from the pre-absorber to the pre-saturator.

A partially refrigerant-enriched absorbent and a residual vapourised refrigerant line may lead respectively from the pre-absorber and from the pre-saturator to the compression absorption stage. The compression absorption stage may comprise a compressor. In a preferred embodiment of the invention, the compressor may be a so called 'liquid ring' pump. For the liquid ring pump, therefore, the suction side supply may comprise (i) the partially refrigerant-enriched absorbent, supplied thereto from the pre-absorber along the partially refrigerant-enriched absorbent transfer line and (ii) the residual vapourised refrigerant, supplied thereto from the pre-saturator along the residual vapourised refrigerant transfer line. The compressor is, however, not limited to being a liquid ring pump and could, instead, comprise any other types of compressor suitable for achieving the desired compression absorption effect, e.g. an Archimedes screw-type compressor or a vane-less impeller compressor.

Thus, in use, residual vapourised refrigerant from the pre-saturator can be contacted with the partially refrigerant-enriched absorbent from the pre-absorber under increased pressure in the compression absorption stage, thereby to form the refrigerant-enriched absorbent which is passed to the refrigerant regeneration stage.

The expander/evaporator stage may include an evaporator in which the refrigerant can be subjected to heat transfer with a higher temperature medium such that energy in the form of heat is transferred from the higher temperature medium to the refrigerant.

The expander/evaporator stage may include an expansion device, typically in the form of an expansion valve or mechanical turbine across which the condensed refrigerant can be expanded to obtain a mixture of liquefied refrigerant and vapourised refrigerant. In such an embodiment, the condensed refrigerant transfer line may lead from the condenser to the expansion device and a refrigerant mixture transfer line may lead from the expansion device to the evaporator.

The refrigerant and absorbent may be as hereinbefore described.

The installation may include a cooling medium source from which cooling medium can be supplied to the condenser along a cooling medium line which leads from the cooling medium source to the condenser. The cooling medium may typically be water or air.

The installation may also include a condensed refrigerant accumulation vessel or tank in which condensed refrigerant can be accumulated, with a condensed refrigerant line leading from the condenser to the accumulation vessel and along which condensed refrigerant can be passed from the condenser to the accumulation vessel.

The installation may further include a condensed refrigerant pump for pumping condensed refrigerant, typically from the condensed refrigerant accumulation vessel, to the expander/evaporator stage, more particularly the expansion stage. The pump may be capable of generating a pressure head sufficient such that a pressure of the refrigerant after expansion across the expansion valve is substantially equal to the vapour pressure of the refrigerant at a desired evaporator stage operating temperature.

The installation may also include a condensed refrigerant heat exchanger upstream of the expansion valve with the condensed refrigerant transfer line leading through the refrigerant heat exchanger to the expansion valve. The vapourised refrigerant transfer line, leading to the absorber stage, may also pass through the condensed refrigerant heat exchanger such that heat can be exchanged between vapourised refrigerant from the evaporator and condensed refrigerant from the condenser in the condensed refrigerant heat exchanger.

The installation may include a higher temperature medium transport line which can carry higher temperature medium which is to be cooled through vapourisation of the refrigerant in the evaporator stage. The higher temperature medium transport line may therefore pass through the evaporator stage in a heat transfer relationship with the refrigerant mixture transfer line. The installation may thus be installed in a cooling relationship with a heat source which can transfer heat to a medium thereby to generate the higher temperature medium in the higher temperature medium transport line.

The pre-absorber may comprise a pre-absorber vessel/column. The vapourised refrigerant transfer line may then lead from the evaporator stage into the bottom of the pre-absorber column with the absorbent liquid transfer line leading from the pre-saturator into the top of the pre-absorber column. It will be appreciated that, in use, absorbent liquid is therefore contacted with vapourised refrigerant in a counter-current fashion in the pre-absorber and that partially refrigerant-enriched absorbent will therefore accumulate in the bottom of the pre-absorber column, with unabsorbed vapourised refrigerant passing to the top of the pre-absorber column. Thus, the partially refrigerant-enriched absorbent transfer line may lead from the bottom of the pre-absorber column and the unabsorbed vapourised refrigerant transfer line may lead from the top of the pre-absorber column.

The pre-saturator may include a pre-saturator vessel, preferably a pre-saturator flash vessel, in which the contacting of the unabsorbed vapourised refrigerant and the refrigerant-depleted absorbent is, at least in part, effected. The pre-saturator may also include a pre-saturator heat exchanger to which refrigerant-depleted absorbent and unabsorbed vapourised refrigerant are fed such that they are contacted with each other in the heat exchanger, the pre-saturator heat exchanger being capable of providing cooling heat transfer for absorption of the unabsorbed vapourised refrigerant into the refrigerant-depleted absorbent. In one embodiment of the invention, the unabsorbed vapourised refrigerant and refrigerant-depleted absorbent transfer lines may meet each other at a mixing point upstream of the pre-saturator flash vessel, preferably also upstream from or, more preferably, at the pre-saturator heat exchanger. Some absorption of the refrigerant into the refrigerant-depleted absorbent therefore takes place already upstream from the pre-saturator flash vessel, upstream from or in the heat exchanger. An inlet stream to the pre-saturator thus, in use, comprises a mixture of unabsorbed vapourised refrigerant and refrigerant-depleted absorbent, of which some of the unabsorbed vapourised refrigerant has already been absorbed into the refrigerant-depleted absorbent. Alternatively, the unabsorbed vapourised refrigerant and refrigerant-depleted absorbent transfer lines may lead separately into the pre-saturator vessel for the unabsorbed vapourised refrigerant and refrigerant-depleted absorbent to contact each other in the pre-saturator vessel, in which case the pre-saturator heat exchanger may be incorporated into the pre-saturator flash vessel.

The absorber stage may thus be provided with a cooling heat transfer arrangement, capable of removing heat generated in the absorber stage by means of cooling heat exchange. Typically, the absorber stage cooling heat transfer arrangement may include an absorber stage cooling medium line along which cooling medium can be supplied to the cooling heat transfer arrangement from the cooling medium source.

Preferably, as explained above, the absorber stage cooling heat transfer arrangement may be arranged in a heat transfer relationship with the pre-saturator. The absorber stage cooling heat transfer arrangement may then typically be arranged so as to exchange, in use, heat against a mixture of the unabsorbed vapourised refrigerant and the refrigerant-depleted absorbent.

The installation may further include a refrigerant-enriched absorbent accumulation stage, typically comprising a refrigerant-enriched absorbent accumulation vessel or tank. The refrigerant-enriched absorbent transfer line may thus lead to the refrigerant-enriched absorbent accumulation vessel, instead of to the regeneration stage. In such a case, the installation may include an accumulated refrigerant-enriched absorbent transfer line leading to the regenerator stage from the refrigerant-enriched absorbent accumulation vessel.

Further, typically when the installation includes a refrigerant-enriched absorbent accumulation vessel, the installation may also include a refrigerant-enriched absorbent pump which is capable of pumping refrigerant-enriched absorbent, typically from the refrigerant-enriched absorbent accumulation vessel, to the regenerator stage. The refrigerant-enriched absorbent pump may be capable of generating a pressure head sufficient such that the refrigerant-enriched absorbent can enter the regenerator stage at the regenerator stage operating pressure.

The installation may also include a refrigerant-enriched absorbent cooling heat exchanger in which the refrigerant-enriched absorbent which exits the absorption stage along the refrigerant-enriched absorbent transfer line can be heat exchanged against a cooling medium. The installation may thus also include a refrigerant-enriched absorbent heat exchanger cooling medium supply line leading from the cooling medium source to the refrigerant-enriched absorbent heat exchanger.

The installation may further include a refrigerant-enriched absorbent accumulation stage residual vapourised refrigerant transfer line which leads from the refrigerant-enriched absorbent accumulation vessel to the vapourised refrigerant transfer line that leads from the evaporator to the absorber stage, more particularly to the pre-absorber. In use, a mixture of residual vapourised refrigerant from the refrigerant-enriched absorbent accumulation stage and vapourised refrigerant from the evaporator may therefore be fed to the pre-absorber.

The installation may still further include at least one refrigerant-enriched absorbent pre-heating stage, typically comprising a number of refrigerant-enriched absorbent pre-heating heat exchangers for pre-heating refrigerant-enriched absorbent prior to the refrigerant-enriched absorbent entering the regenerator stage. More particularly, the installation may include a first refrigerant-enriched absorbent pre-heating heat exchanger to which the refrigerant-enriched absorbent transfer line or accumulated refrigerant-enriched absorbent transfer line, as the case may be, leads and in which the refrigerant-enriched absorbent transfer line or accumulated refrigerant-enriched absorbent transfer line is provided in a heat-transfer relationship with an upstream portion of the refrigerant-enriched absorbent transfer line.

The installation may alternatively, but more preferably additionally, also include a second refrigerant-enriched absorbent pre-heating heat exchanger to which the refrigerant-enriched absorbent transfer line or accumulated refrigerant-enriched absorbent transfer line, as the case may be, leads and in which the refrigerant-enriched absorbent transfer line or accumulated refrigerant-enriched absorbent transfer line is provided in a heat-transfer relationship with the refrigerant-depleted absorbent transfer line which leads from the regenerator stage to the absorber stage.

In a preferred embodiment of the invention, the refrigerant-enriched absorbent transfer line or accumulated refrigerant-enriched absorbent transfer line, as the case may be, is split between the first and second refrigerant-enriched absorbent pre-heating heat exchangers and is thereafter recombined before entering the regenerator. Alternatively, the split lines lead into the regenerator independently.

The regenerator may include a regenerator column, more particularly a fractionation column, with heating being provided at the bottom of the column to fractionate, in use, the refrigerant-enriched absorbent to recover refrigerant therefrom through fractional vapourisation. It will be appreciated that, in use, recovered vapourised refrigerant will accumulate in a top of the column and refrigerant-depleted absorbent will accumulate at the bottom of the column. Thus, the refrigerant-enriched absorbent transfer line or accumulated refrigerant-enriched absorbent transfer line, as the case may be, may enter the regenerator column substantially at a top portion thereof, with the recovered vapourised refrigerant line leading from the top of the regenerator column and the refrigerant-depleted absorbent line leading from the bottom of the reactor.

The installation may further include a regenerator stage heating heat transfer arrangement. The regenerator stage heating heat transfer arrangement may include at least one heating heat transfer medium line along which a heating heat transfer medium can be passed in a heat transfer relationship with the regenerator column to heat, in use, the regenerator column and thus the refrigerant-enriched absorbent to evaporate and recover refrigerant therefrom. Preferably, the installation includes, in the regenerator stage heating heat transfer arrangement, two heating heat transfer medium lines.

The installation may further include, also in the regenerator stage heating heat transfer arrangement, a refrigerant-depleted absorbent heat transfer line, which passes in a heat transfer relationship with the regenerator column.

In accordance with yet another aspect of the invention, there is provided a method of operating an absorption stage of a vapour absorption refrigeration system, the method including contacting, in a pre-contacting stage, vapourised refrigerant originating from the evaporation stage with the refrigerant-depleted absorbent to obtain a partially refrigerant saturated absorbent; and contacting, in a main contacting stage, vapourised refrigerant with the partially refrigerant saturated absorbent, thereby to obtain the partially refrigerant-enriched absorbent.

The pre-contacting stage may, in particular, be a pre-saturation stage and the main contacting stage a pre-absorption stage. The method may then include passing vapourised refrigerant form an evaporation stage of the system into the pre-absorption stage;

in the pre-absorption stage, absorbing vapourised refrigerant into an absorption liquid from the pre-saturation stage;

withdrawing non-absorbed vapourised refrigerant from the pre-absorption stage and passing it into the pre-saturation stage together with the refrigerant-depleted absorbent from the regeneration stage, with the refrigerant-depleted absorbent thus being pre-contacted and partially saturated with the vapourised refrigerant in the pre-saturation stage, thereby to obtain the partially saturated absorbent; and withdrawing the partially saturated absorbent from the pre-saturation stage and passing it into the pre-absorption stage so that it constitutes the absorption liquid in the pre-absorption stage.

The method may further include subjecting the partially refrigerant enriched absorbent and residual vaporized refrigerant to compression absorption in a compression absorption stage. The method may then include withdrawing residual vapourised refrigerant from the pre-saturation stage;

withdrawing partially refrigerant-enriched absorbent from the pre-absorption stage;

passing the residual vapourised refrigerant from the pre-saturation stage and the absorbent from the pre-absorption stage into the compression absorption stage in which the residual vapourised refrigerant is contacted with the absorbent under pressure, thereby to form the refrigerant-enriched absorbent which is passed to the refrigerant regeneration stage.

The pre-saturation stage, pre-absorption stage and compression absorption stage may each be and may be carried out as is hereinbefore described.

In accordance with yet a further aspect of the invention, there is provided an absorption stage installation for a vapour absorption refrigeration installation, the absorption stage installation including a pre-contacting stage in which refrigerant-depleted absorbent can be pre-contacted with vapourised refrigerant originating from the evaporator to obtain a partially refrigerant saturated absorbent; and a main contacting stage in which the partially refrigerant saturated absorbent can be contacted with vapourised refrigerant to obtain a partially refrigerant-enriched absorbent.

More specifically, the pre-contacting stage may comprise a pre-saturator, while the main contacting stage may comprise a pre-absorber. The absorption stage installation may then include the pre-absorber to which heated refrigerant can be fed from the evaporator along the heated refrigerant transfer line and in which the heated refrigerant can be contacted with an absorption liquid from the pre-saturator and into which it can be absorbed to obtain partially refrigerant enriched absorbent, with an absorption liquid transfer line leading from the pre-saturator into the pre-absorber;

the pre-saturator to which refrigerant-depleted absorbent can be fed from the regenerator along the refrigerant-depleted absorbent transfer line and in which it can be contacted with non-absorbed vapourised refrigerant from the pre-absorption stage, thereby to pre-saturate the refrigerant-depleted absorbent, with an unabsorbed vapourised refrigerant transfer line leading from the pre-absorber to the pre-saturator.

The absorption stage installation may further include a compression absorption stage, comprising a compression absorber, in which residual vapourised refrigerant from the pre-saturator can be contacted, under compression or pressure, with partially refrigerant-enriched absorbent from the pre-absorber.

BRIEF SUMMARY OF THE INVENTION

The invention provides methods of carrying out vapour absorption refrigeration, including, but not limited to, in a condensing stage, condensing a refrigerant in vapour form to obtain condensed or liquefied refrigerant; passing this liquefied refrigerant into an expansion/evaporation stage; in the expansion/evaporation stage, subjecting the refrigerant to heat transfer with a higher temperature medium such that heat is transferred from the higher temperature medium to the refrigeration temperature and the refrigerant being heated such that at least some of the liquefied refrigerant is evaporated, thereby to obtain vapourised refrigerant; passing the vapourised refrigerant from the evaporation stage into an absorption stage; absorbing, in the absorption stage, some of the vapourised refrigerant into an absorbent at a first pressure, thereby to obtain partially refrigerant-enriched absorbent and residua vapourised refrigerant; a compression absorption stage, comprising a compressor having a suction side and a discharge, pressure side, passing the partially refrigerant-enriched absorbent and the residual vapourised refrigerant to the suction side of the compressor and contacting, by means of the compressor, the partially refrigerant-enriched absorbent and residual vapourised refrigerant under compression, at a second pressure that is greater than the first pressure, thereby obtaining refrigerant-enriched absorbent that is withdrawn, or discharged, from the discharge, pressure side of the compressor, with the compressor having increased the pressure of the partially refrigerant-enriched absorbent and residual vapourised refrigerant and with residual vapourised refrigerant consequently having been absorbed into the partially refrigerant-enriched absorbent; passing refrigerant-enriched absorbent from the compression absorption stage into a refrigerant regeneration stage; in the regeneration stage, recovering refrigerant, in vapour form, from the refrigerant-enriched absorbent thereby to obtain refrigerant-depleted absorbent; recycling recovered vapourised refrigerant from the regeneration stage to the condensing stage; and recycling refrigerant-depleted absorbent from the regeneration stage to the absorption stage with the recycled refrigerant-depleted absorbent constituting absorbent in the absorption stage, wherein the absorption stage includes contacting, in a pre-contacting stage, vapourised refrigerant with the refrigerant-depleted absorbent to obtain partially refrigerant-saturated absorbent; and contacting, in a main contacting stage, vapourised refrigerant with the partially refrigerant-saturated absorbent, thereby to obtain the partially refrigerant-enriched absorbent that is passed to the compressor in the compression absorption stage, with the pre-contacting stage being a pre-saturation stage and the main contacting stage being a pre-absorption stage and with absorbing the vapourised refrigerant into the refrigerant-depleted absorbent in the absorption stage including passing vapourised refrigerant from the evaporation stage into the pre-absorption stage; in the pre-absorption stage, absorbing vapourised refrigerant from the evaporation stage into an absorption liquid from the pre-saturation stage, thereby to obtain the partially refrigerant-enriched absorbent that is passed to the compressor in the compression absorption stage; withdrawing unabsorbed vapourised refrigerant from the evaporation stage and passing it into the pre-saturation stage together with the refrigerant-depleted absorbent from the regeneration stage, with the refrigerant-depleted absorbent thus being pre-contacted and partially saturated with the unabsorbed vapourised refrigerant in the pre-saturation stage, thereby to obtain the partially refrigerant-saturated absorbent and also to obtain the residual vapourised refrigerant that is passed to the compressor in the compression absorption stage; and withdrawing the partially refrigerant-saturated absorbent from the pre-saturation stage and passing it into the pre-absorption stage so that it constitutes the absorption liquid in the pre-absorption stage.

The invention also provides absorption refrigeration installations which include a condenser in which a refrigerant in vapour form can be condensed, to obtain a condensed or liquefied refrigerant; an expander/evaporator stage in which the refrigerant can be subjected to heat transfer with a higher temperature medium such that energy in the form of heat is transferred from the higher temperature medium to the refrigerant, with the higher temperature medium being cooled or refrigerated to a desired refrigeration temperature and the refrigerant being vapourised, with a condensed refrigerant transfer line leading from the condenser to the expander/evaporator stage; an absorption stage in which some of the vapourised refrigerant can be absorbed, at a first pressure, into an absorbent to obtain a partially refrigerant-enriched absorbent, with a vapourised refrigerant transfer line leading from the evaporator stage into the absorption stage, the absorption stage comprising a pre-contacting stage in which refrigerant-depleted absorbent can be pre-contacted with vapourised refrigerant to obtain a partially refrigerant-saturated absorbent; and a main contacting stage in which the partially refrigerant-saturated absorbent can be contacted with vapourised refrigerant to obtain a partially refrigerant-enriched absorbent, wherein the main contacting stage is a pre-absorber and the pre-contacting stage is a pre-saturator, with the absorption stage thus including the pre-absorber to which vapourised refrigerant can be fed from the evaporator along the vapourised refrigerant transfer line and in which the vapourised refrigerant can be contacted with an absorption liquid from the pre-saturator into which it can be absorbed to obtain the partially refrigerant-enriched absorbent, with an absorption liquid transfer line leading from the pre-saturator into the pre-absorber; the pre-saturator to which refrigerant-depleted absorbent can be fed from the regenerator along the refrigerant-depleted absorbent transfer line and in which it can be contacted with unabsorbed vapourised refrigerant from the pre-absorption stage, thereby to pre-saturate the refrigerant-depleted absorbent and obtain the partially refrigerant-saturated absorbent that can be passed to the pre-absorber along the absorption liquid transfer line to constitute the absorption liquid in the pre-absorber, with an unabsorbed vapourised refrigerant transfer line leading from the pre-absorber to the pre-saturator; a compression absorption stage comprising a compressor having a suction side to which the partially refrigerant-enriched absorbent from the pre-absorber and residual vapourised refrigerant from the pre-saturator can be fed respectively along a partially refrigerant-enriched absorbent transfer line and a residual vapourised refrigerant transfer line and being capable of increasing the pressure of the partially refrigerant-enriched absorbent and residual vapourised refrigerant thereby to contact the partially refrigerant-enriched absorbent and residual vapourised refrigerant under compression, consequently to absorb residual vapourised refrigerant into the partially refrigerant-enriched absorbent at a second pressure that is greater than the first pressure and obtain refrigerant-enriched absorbent, with the compressor further having a discharge, pressure side from which the refrigerant-enriched absorbent can be withdrawn; a regenerator stage in which refrigerant can be recovered, in vapour form, from the refrigerant-enriched absorbent thereby to obtain a refrigerant-depleted absorbent, with a refrigerant-enriched absorbent transfer line leading into the regenerator stage; a recovered vapourised refrigerant transfer line leading from the regenerator stage to the condenser and along which recovered refrigerant can be withdrawn from the regenerator and passed to the condenser; and a refrigerant-depleted absorbent transfer line leading from the regenerator and along which refrigerant-depleted absorbent can be withdrawn from the regenerator, with this transfer line leading into the absorption stage so that the refrigerant-depleted absorbent constitutes the absorbent in the absorption stage.

BRIEF DESCRIPTION OF THE DRAWING

FIG. 1. Schematic representation of a typical embodiment of the invention.

DETAILED DESCRIPTION OF THE INVENTION

The pre-saturator, pre-absorber and compression absorption stage, or compression absorber, may each be as is hereinbefore described.

The invention will now be described by way of illustrative example only with reference to the accompanying diagrammatic drawing which shows a process flow diagram of a vapour absorption refrigeration installation.

In the drawing (FIG. 1), reference numeral 10 generally indicates a vapour absorption installation in accordance with the invention.

The installation 10 includes a condensed refrigerant accumulation vessel 12, in which a condensed refrigerant, comprising ammonia in the illustrated embodiment, is accumulated at the condenser outlet temperature and at a pressure high enough to maintain the ammonia in the liquid phase.

An ammonia refrigerant transfer line 14, along which ammonia can be withdrawn from the ammonia accumulation vessel 12, leads from the accumulation vessel 12 to an expander/evaporator stage or system, generally indicated by reference numeral 16.

A pump 18 is provided in the transfer line 14 for generating a pressure head to transfer refrigerant from the accumulation vessel 12 to the expander/evaporator system 16 along the transfer line 14, such that the refrigerant is delivered to the evaporation system 16 at a pressure that is higher than a pressure at which the refrigerant was accumulated in the accumulation vessel 12.

The expander/evaporator system 16 comprises an expansion device 20 and an evaporator 22 which are connected in series, with the expansion device 20 being provided upstream of the evaporator 22.

A refrigerant cooling heat exchanger 24 is provided upstream of the expansion device 20, with the transfer line 14 thus leading to the expander/evaporator system 16 through the heat exchanger 24.

From the heat exchanger 24, the refrigerant transfer line, 14, leads to the expansion device 20.

From the expansion device 20, a mixed-phase refrigerant transfer line, 26, leads to the evaporator 22.

In the evaporator 22, the mixed-phase refrigerant transfer line 26 passes in a heat transfer relationship with a higher temperature medium, cooling of which is desired. The heating medium flows, in the illustrated embodiment, along a higher temperature medium circulation line, generally indicated by reference numeral 29.

From the evaporator 22, a vapourised refrigerant transfer line 28 leads to an absorber system or stage, generally indicated by reference numeral 30.

Upstream of the absorber system 30, the refrigerant transfer line 28 passes through the refrigerant cooling heat exchanger 24 in a heat transfer relationship with the refrigerant transfer line 14.

The absorber system 30 includes a pre-contacting stage, comprising a pre-saturator system 32, and a main contacting stage, comprising a pre-absorber 34. An absorber stage refrigerant feed line 36 leads into the pre-contacting stage 34. A refrigerant-depleted absorbent transfer line 37 leads into the pre-saturator system 32. An unabsorbed refrigerant vapour transfer line 38 leads from the pre-absorber 34 to the pre-saturator system 32 and a pre-saturated absorbent liquid transfer line 40 leads from the pre-saturator system 32 to the pre-absorber 34.

The pre-saturator system 32 includes a pre-saturator heat exchanger 42 and a pre-saturator flash vessel 44, with the heat exchanger 42 being provided upstream of the flash vessel 44. In the illustrated embodiment, the unabsorbed vapourised refrigerant line 38 is combined with the refrigerant-depleted transfer line 37, and the unabsorbed vapourised refrigerant is thus contacted with the refrigerant-depleted absorbent, upstream of the heat exchanger 42. A combined refrigerant/absorbent feed line 46 then leads to the heat exchanger 42 in which it passes in a heat transfer relationship with a cooling medium circulation line 48.

A cooled refrigerant/absorbent transfer line 50 leads from the heat exchanger 42 into the flash vessel 44.

It will be appreciated that, in accordance with the invention, other pre-saturator configurations than the presently illustrated embodiment may be possible. For instance, it is envisaged that the pre-saturator flash vessel 44 and the heat exchanger 42 can be operated as a single process unit, with such a combined pre-saturator column then operating with simultaneous absorption and heat removal. Alternatively, the pre-absorber may be operated with the heat exchanger 42 and flash vessel 44, as presently illustrated, but combination of the refrigerant-depleted absorbent transfer line 37 and the unabsorbed vapourised refrigerant transfer line 38 can occur inside the heat exchanger 42.

A residual vapourised refrigerant transfer line 52 leads from the pre-saturator system 32, more particularly from the pre-saturator flash vessel 44, and a partially refrigerant-enriched transfer line 54 leads from the pre-absorber 34.

Both the residual vapourised refrigerant transfer line 52 and the partially refrigerant-enriched transfer line 54 lead into a compression absorption system 56. The compression absorption system 56 comprises a compressor in the form of a liquid ring pump 58, both the residual vapourised refrigerant transfer line 52 and the partially refrigerant-enriched transfer line 54 leading into the suction side of the liquid ring pump.

A refrigerant-enriched absorbent transfer line, 60, leads from the compression absorption system 56, more particularly from the discharge side of the liquid ring pump 58 of the compression absorption system 56, to an absorbent regeneration system generally referenced by reference numeral 62.

The absorbent regeneration system 62 includes a refrigerant-enriched absorbent accumulation vessel 64 into which the transfer line 60 leads.

Upstream of the accumulation vessel 64, the transfer line 60 passes through a refrigerant-enriched absorbent cooling heat exchanger 66 in a heat transfer relationship with a cooling medium circulation line 68.

A refrigerant-enriched absorbent accumulation stage residual vapourised refrigerant transfer line 70 leads from the accumulation vessel 64 and meets, and is combined with, the vapourised refrigerant transfer line 28, which leads from the evaporator 22, at a mixing point 72 upstream of the absorber system 30. The absorber system refrigerant feed line 36 therefore leads from the mixing point 72 to the absorber system 30, more particularly to the pre-absorber 34.

The regeneration system 62 also includes a regenerator column 69, downstream of the accumulation vessel 64.

An accumulated refrigerant-enriched absorbent transfer line 74 leads from the accumulation vessel 64. A pump 76 is provided in the transfer line 74. The transfer line is split into first and second transfer lines 74.1, 74.2 upstream of the regenerator column 69. Instead, the transfer lines 74.1, 74.2 may lead into the regenerator column 69 independently.

The transfer line 74.1 leads into a first pre-heating heat exchanger 77 through which the line 74.1 passes in a heat transfer relationship with the refrigerant-enriched absorbent transfer line 60 from the compression absorption system 56, more particularly from the liquid ring pump 58, upstream of the heat exchanger 66 and the accumulation vessel 64.

The transfer line 74.2 leads into a second pre-heating heat exchanger 78 through which the line 74.2 passes in a heat transfer relationship with the refrigerant-depleted absorbent transfer line 37, upstream of the pre-saturator 32 to which the line 37 leads.

The transfer lines 74.1, 74.2 are recombined at a mixing point 80 downstream from the heat exchangers 77, 78 to form a refrigerant-enriched absorbent feed line 82 which leads into the regeneration column 69.

A regenerated absorbent transfer line 84 and the refrigerant-depleted absorbent transfer line 37 respectively lead from the top and the bottom of the regeneration column 69.

The refrigerant-depleted absorbent transfer line 37 is passed in a heat transfer relationship with the regenerator column 69 upstream of the second pre-heating heat exchanger 78. In the illustrated embodiment, the heat transfer relationship is illustrated by means of a first regenerator column heat exchanger 86.

A refrigerant-depleted absorbent circulation line 88 leads from the transfer line 37 upstream of the heat exchanger 86 and downstream from the regenerator column 69. The line 88 leads back into the regenerator column 69, after passing in a heat transfer relationship with a first heat transfer medium line 90 in a second regenerator column heat exchanger 92.

Further heating is provided to the regenerator column 69 by passing a second heat transfer medium line 94 in a heat transfer relationship with the column 69. In the illustrated embodiment, the heat transfer relationship is illustrated by means of a third regenerator column heat exchanger 96.

The regenerated refrigerant transfer line 84 leads from the top of the regenerator column 69 into a refrigerant condenser 98 in which the line 84 passes in a heat transfer relationship with a cooling medium line 100.

A condensed refrigerant transfer line 102 leads from the condenser 98 into the refrigerant accumulation vessel 12.

In use, ammonia refrigerant, in substantially pure form, is accumulated in the accumulation vessel 12 in liquid form and at a pressure high enough to maintain the condensed ammonia in the liquid phase. Typically the ammonia is at a temperature of about 35° C. in the accumulation vessel.

A liquid ammonia stream is then withdrawn from the accumulation vessel 12 along transfer line 14 and is pumped, by means of the pump 18, to the expander/evaporator system 16. Part of the liquid ammonia stream is returned as reflux along line 15 to the top of the regenerator in order to provide the required fractionating effect in the regenerator.

Prior to entering the expander/evaporator system 16, the liquid ammonia stream flowing along transfer line 14 is heat exchanged in the heat exchanger 24 against vapourised ammonia flowing along transfer line 28 to pre-cool the ammonia and increase the refrigeration potential which may be lost through partial vapourisation across the expansion device 20. Typically, the condensed refrigerant is cooled in the heat exchanger 24 to a temperature of between about 0° C. and about 34° C.

From the heat exchanger 24, the now cooled ammonia stream is passed to the expansion device 20, at a pressure of between about 6 bar (abs) and about 26 bar (abs), across which the ammonia is expanded by reducing the pressure thereof to between about 1.3 bar (abs) and about 4.5 bar (abs). The expansion causes the ammonia to be at least partially vapourised and cooled, thereby increasing its capacity to remove heat from a higher temperature source. A liquid/vapour ammonia stream is therefore withdrawn from the expansion device 20 along transfer line 26.

Expansion of the liquid ammonia stream across the expansion device 20 is sufficient to bring the ammonia exiting the expansion device to the vapour pressure of the ammonia at the desired refrigeration temperature, said vapour pressure thus preferably being between about 1.3 bar (abs) and about 4.5 bar (abs) for a refrigeration temperature of between about −30° C. and about 5° C. In the present case, the desired refrigeration temperature is −18° C. and the corresponding vapour pressure about 1.9 bar (abs).

The liquid/vapour ammonia stream is thus transferred to the evaporator 22 along transfer line 26.

In the evaporator 22, the liquid/vapour ammonia stream is heat exchanged against the higher temperature medium flowing in the higher temperature medium circulation line 29. The liquid/vapour ammonia stream absorbs heat from the higher temperature medium, ideally at constant pressure and temperature, thereby cooling the higher temperature medium and increasing its own enthalpy to vapourise completely and exit the evaporator 22 along transfer line 28 as a saturated refrigerant vapour stream at a temperature of about −18° C. and a pressure of about 1.9 bar (abs).

Prior to being transferred to the absorption system 30, and as mentioned above, the refrigerant stream flowing along transfer line 28 is heat exchanged against the liquid refrigerant stream flowing along transfer line 14 in the heat exchanger, 24 so as to be cooled to a temperature of between about 34° C. and about 0° C.

The vapourised ammonia stream is thus transferred, after having passed through the heat exchanger 24, to the absorber system 30, more particularly to the pre-absorber 34.

In the absorber column 34, the vapourised ammonia flowing along transfer line 36 is absorbed into an absorbent in the form of an ammonia-enriched liquid water stream supplied in transfer line 40, thereby to obtain a further ammonia-enriched liquid water stream 54. In the compression absorption stage 56, the ammonia enriched liquid water stream 54 is combined with the residual vapourised refrigerant stream 52 to generate a refrigerant-enriched absorbent stream 60 from which the ammonia can be recovered in the regenerator system 62 for re-use in the evaporator 22.

Prior to being introduced into the pre-absorber 34, the vapourised ammonia stream flowing along transfer line 36 is combined with residual vapourised ammonia from the accumulation vessel 64 at the mixing point 72. The vapourised ammonia stream is then introduced into the bottom of the pre-absorber 34 with pre-saturated absorbent liquid being introduced into a top of the pre-absorber 34 from the pre-saturator 32 along transfer line 40. Thus, the vapourised refrigerant stream is contacted with the pre-saturated absorbent liquid in a counter-current fashion in the pre-absorber 34, with partially refrigerant-enriched ammonia accumulating in the bottom of the pre-absorber 34 and unabsorbed vapourised ammonia accumulating in the top of the pre-absorber 34.

The absorption system 30, and more particularly the pre-absorber 34, is operated at slightly reduced pressure in relation to that of the evaporator, more specifically at about 1.8 bar (abs). This constitutes the "first pressure", referred to hereinafter from time to time and may, instead, be between about 1.3 bar (abs) and 4.5 bar (abs) in accordance with the invention.

The unabsorbed vapourised ammonia accumulating in the top of the pre-absorber 34 is withdrawn from the pre-absorber 34 along transfer line 38 and is mixed with refrigerant-depleted absorbent flowing along transfer line 37, thereby obtaining an ammonia/water stream which flows along transfer line 46.

It will be appreciated that, in being combined with the ammonia-depleted water stream, at least some of the ammonia will be absorbed in the ammonia-depleted water stream due to mass transfer occurring between the unabsorbed vapourised ammonia refrigerant and the ammonia refrigerant-depleted water absorbent. This will result in the temperature of the ammonia/water stream increasing as a result of heat of absorption that is generated. Thus, the water/ammonia stream is passed along transfer line 46 to the heat exchanger 48 to cool the water/ammonia stream prior to transferring the stream to the pre-saturation column 32. In the heat exchanger 42, the water/ammonia stream is heat exchanged against a cooling water stream flowing along circulation line 48 to achieve further absorption of ammonia. The temperature and flow rate of the cooling water in circulation line 48 is selected such that the water/ammonia stream is cooled to a temperature of about 35° C. before entering the flash vessel 44 along transfer line 50. It will be appreciated that, upstream of the pre-saturator flash vessel 44, cooling heat transfer thus occurs simultaneously with mass transfer between the unabsorbed ammonia refrigerant and the ammonia-depleted water absorbent.

In the flash vessel 44, the unabsorbed vapourised ammonia and ammonia-depleted water is further contacted with the ammonia-depleted water becoming partially saturated with ammonia. The partially saturated ammonia is transferred as a partially saturated ammonia stream to the pre-absorber 34 along the transfer line 40, with the partially saturated ammonia thus constituting the absorbent liquid in the pre-absorber 34.

Residual unabsorbed ammonia vapour is withdrawn as a residual ammonia vapour stream from the top of the flash vessel 44 along transfer line 52. Partially ammonia-enriched absorbent is withdrawn along transfer line 54 from the bottom of the pre-absorber 34.

The residual ammonia vapour stream and the partially ammonia-enriched absorbent stream are then fed to the suction side of the liquid ring pump 58. In the liquid ring pump 58, the partially ammonia-enriched absorbent stream is centrifugally dispersed as a substantially cylindrical liquid film, possibly but not limited to, by means of an impeller which is located in the pump 58, possibly off-centre with an axis of the pump body. Blades of the impeller define compression volumes between them, the blades partially intruding into the liquid film when travelling about a rotation axis thereof and thus reducing the volume of the compression volumes, thereby compressing any gas or vapour which may reside therein. The residual ammonia vapour stream is introduced into the eye of the liquid film and intrudes in between impellers of the liquid ring pump 58, thus being compressed and consequently compression absorbed into the liquid film when the impellers intrude into the liquid film. It is important to note that the invention is not limited to such a configuration of a liquid ring pump, or to a liquid ring pumps per se for that matter. Any pump or other pressure-generating equipment or compressor capable of increasing the pressure of the residual vapourised refrigerant and partially refrigerant-enriched absorbent thereby to achieve the desired compression absorption effect would be suitable for constituting the compression absorption stage. Such other types of compressors may include Archimedes screw-type compressors and vane-less, or bladeless, impeller pumps or compressors.

The liquid ring pump 58 operates at a pressure of between about 3.5 bar (abs) and about 10 bar (abs), constituting the second pressure. The second pressure is greater than the first pressure.

An ammonia-enriched water stream is thus discharged from the pressure side of the liquid ring pump 58 along transfer line 60 and is passed to the accumulation vessel 64. The ammonia-enriched water stream has an ammonia concentration of about 50 mol %.

As a result of the compression absorption of the residual vapourised ammonia stream into the partially ammonia-enriched water stream, the temperature of the resulting ammonia-enriched water stream increases due to the generation of heat of absorption. Thus, prior to entering the accumulation vessel 64, the ammonia-enriched water stream is heat exchanged, firstly, with a first branched accumulated ammonia-enriched water stream which flows along line 74.1 in the first pre-heating heat exchanger 77, and, secondly, with a cooling water stream flowing in the circulation line 68 in the heat exchanger 66. The flow rate and temperature of the cooling water stream is selected such that the ammonia-enriched water stream exits the heat exchanger 66 at a temperature of 35° C.

An accumulated ammonia-enriched water stream is withdrawn from the accumulation vessel 64 along transfer line 74 and is pumped by means of the pump 76 to the regeneration column 69.

The accumulated ammonia-enriched water stream is split, upstream of the regenerator column 69 along transfer lines 74.1 and 74.2, respectively as the first branched accumulated ammonia-enriched water stream and a second branched accumulated ammonia-enriched water stream.

The first branched accumulated ammonia-enriched water stream is heat exchanged against the ammonia-enriched water stream flowing along transfer line 60. The second branched accumulated ammonia-enriched water stream is heat exchanged, in the heat exchanger 78, against the ammonia-depleted water stream which flows along transfer line 37.

The first and second branched streams are then recombined at the mixing point 80, where after they are fed as ammonia enriched water feed stream to the regenerator column 69. The heat exchangers 77, 78 are configured collectively to raise the temperature of the respective first and second branch streams such that the temperature of the feed stream is about 80° C.

In the regenerator column 69, ammonia is recovered from the ammonia-enriched water feed stream by heating the ammonia-enriched water in the regenerator column so as to fractionate out the ammonia whilst keeping the water in liquid form, thereby obtaining recovered ammonia, which is withdrawn from the regenerator column 69 as a recovered ammonia stream along transfer line 84, and ammonia-depleted water, which is withdrawn from the regenerator column 69 as the ammonia-depleted water stream along transfer line 37. The depleted-ammonia water stream obtained has an ammonia concentration of about 2.5 mol % and leaves the regenerator column 69 at a temperature of about 185° C.

The regenerator column operates at a pressure of about 13.2 bar (abs). Preferably, the pump 76 therefore generates a pressure head sufficient to introduce the ammonia-enriched water stream into the regenerator column at the regenerator column operating pressure.

Heating of the ammonia-enriched water in the regenerator column is, as indicated hereinbefore, achieved by means of the first, second and third regenerator column heat exchangers 86, 92, and 96.

In the first heat exchanger 86, the ammonia-depleted water stream is passed in a heat transfer relationship with the regenerator column 69.

A circulating stream of the ammonia-depleted water stream is withdrawn from the transfer line 37 along the transfer line 88 and is passed in a heat transfer relationship with a first heating medium flowing along circulation line 90, in the second heat exchanger 92, and is then returned to the regenerator column 69. The first heating medium is at an inlet temperature of about 200° C., the invention not necessarily being limited to such a temperature depending on the design of the installation 10, possibly being between about 125° C. and about 275° C.

The third heat exchanger 96 passes a second heating medium flowing in circulation line 94 in a heat transfer relationship with the regenerator column 69. The second heating medium is at an inlet temperature of about 175° C., the invention not necessarily being limited to such a temperature depending on the design of the installation 10, possibly being between about 125° C. and about 275° C.

The recovered vapourised ammonia stream withdrawn from the top of the regenerator column 69 along transfer line 84 is passed to a condenser 98 in which the vapourised ammonia stream is condensed by passing the stream in a heat transfer relationship with a cooling medium stream flowing along circulation line 100.

From the condenser 98, the condensed ammonia is transferred to the ammonia accumulation vessel 12 from where the ammonia can be re-circulated to the evaporator 22.

The installation 10, as described, is expected to be able to provide refrigeration for any desired evaporator duty, but particularly for an evaporator duty between about 0.5 MW and about 5 MW.

In a particular embodiment of the invention, the properties of various streams of the system 10 were determined for a 0.5 MW evaporator duty. These properties are included in the following table (Table 1):

TABLE 1

| | Stream data for 0.5 MW evaporator duty | | | | | | | | |
|---|---|---|---|---|---|---|---|---|---|
| ID' | 14u | 14d | 28u | 28d | 36 | 37u | 37i | 37d | 38 |
| STREAM | STR #5 | STR #23 | STR #29 | STR #4 | STR #14 | STR #24 | STR #20 | STR #3 | STR #6 |
| PHASE | LIQUID | LIQUID | VAP/LIQ | VAPOUR | VAPOUR | LIQUID | LIQUID | LIQUID | VAPOUR |
| TOTAL STREAM | | | | | | | | | |
| $NH_3$ Composition Rate, KG-MOL/HR | — | — | — | — | — | — | — | 2.37 | — |
| $H_2O$ Composition Rate, KG-MOL/HR | — | — | — | — | — | — | — | 92.5 | — |

TABLE 1-continued

Stream data for 0.5 MW evaporator duty

| | | | | | | | | | |
|---|---|---|---|---|---|---|---|---|---|
| RATE, KG-MOL/HR | 97.63 | 97.63 | 97.63 | 97.63 | 97.63 | 94.87 | 94.87 | 94.87 | 96.84 |
| $10^3$ KG/HR | 1.663 | 1.663 | 1.663 | 1.663 | 1.663 | 1.707 | 1.707 | 1.707 | 1.651 |
| LIQ RATE @ 15.6° C., M²/HR | 2.7 | 2.7 | 2.7 | 2.7 | 2.7 | 1.734 | 1.734 | 1.734 | 2.66 |
| TEMPERATURE, C. | 34.35 | 11.63 | −18.07 | 29.35 | 29.35 | 184.39 | 106.09 | 40.00 | 34.03 |
| PRESSURE, KG/CM2 ABS | 13.50 | 13.50 | 2.11 | 2.11 | 2.11 | 13.70 | 13.70 | 13.70 | 1.85 |
| MOL WT | 17.03 | 17.03 | 17.03 | 17.03 | 17.03 | 17.99 | 17.99 | 17.99 | 17.05 |
| ENTHALPY, $10^6$ WATT | 0.0736 | 0.0245 | 0.5900 | 0.6390 | 0.6390 | 0.3750 | 0.2120 | 0.0797 | 0.6500 |
| STD LIQ DENSITY, KG/M3 | 615.9 | 615.9 | 615.9 | 615.9 | 615.9 | 984.5 | 984.5 | 984.5 | 620.8 |
| SPECIFIC GRAVITY | 0.6165 | 0.6165 | 0.6165 | 0.6165 | 0.6165 | 0.9855 | 0.9855 | 0.9855 | 0.6214 |
| VAPOUR | | | | | | | | | |
| RATE, KG-MOL/HR | — | — | 97.14 | 97.63 | 97.63 | — | — | — | 96.84 |
| $10^3$ KG/HR | — | — | 1.654 | 1.663 | 1.663 | — | — | — | 1.651 |
| $10^2$ M3/HR | — | — | 0.971 | 1.168 | 1.168 | — | — | — | 1.345 |
| VAP RATE @ 0° C. 1 ATM, $10^2$ M3/HR | — | — | 2.177 | 2.188 | 2.188 | — | — | — | 2.171 |
| SPEC GRAVITY (AIR = 1.0) | — | — | 0.588 | 0.588 | 0.588 | — | — | — | 0.589 |
| MOL WT | — | — | 17.031 | 17.031 | 17.031 | — | — | — | 17.05 |
| ENTHALPY, KW-HR/KG | — | — | 0.356 | 0.384 | 0.384 | — | — | — | 0.394 |
| CP, KW-HR/KG-C | — | — | 0.000577 | 0.000591 | 0.000591 | — | — | — | 0.000591 |
| DENSITY, KG/$10^2$ M³/HR | — | — | 1704.5 | 1423.0 | 1423.0 | — | — | — | 1227.8 |
| Z (FROM DENSITY) | — | — | 0.9745 | 0.9843 | 0.9843 | — | — | — | 0.9864 |
| TH COND, KCAL/HR-M-C | — | — | 0.0172 | 0.0218 | 0.0218 | — | — | — | 0.0222 |
| VISCOSITY, CP | — | — | 0.0086 | 0.0103 | 0.0103 | — | — | — | 0.0105 |
| LIQUID | | | | | | | | | |
| RATE, KG-MOL/HR | 97.63 | 97.63 | 0.49 | — | — | 94.87 | 94.87 | 94.87 | — |
| $10^3$ KG/HR | 1.663 | 1.663 | 0.008 | — | — | 1.707 | 1.707 | 1.707 | — |
| M3/HR | 2.83 | 2.675 | 0.0126 | — | — | 2.045 | 1.839 | 1.754 | — |
| LIQ RATE @ 15.6° C., M³/HR | 2.7 | 2.7 | 0.0135 | — | — | 1.734 | 1.734 | 1.734 | — |
| SPECIFIC GRAVITY | 0.6165 | 0.6165 | 0.6166 | — | — | 0.9855 | 0.9855 | 0.9855 | — |
| MOLECULAR WEIGHT | 17.031 | 17.031 | 17.031 | — | — | 17.991 | 17.991 | 17.991 | — |
| ENTHALPY, KW-HR/KG | 0.0443 | 0.0147 | −0.0226 | — | — | 0.2200 | 0.1240 | 0.0467 | — |
| CP, KW-HR/KG-C | 0.00133 | 0.00128 | 0.00125 | — | — | 0.00123 | 0.00120 | 0.00117 | — |
| DENSITY, KG/M3 | 587.5 | 621.6 | 662.2 | — | — | 834.4 | 927.9 | 973.1 | — |
| Z (FROM DENSITY) | 0.01500 | 0.01530 | 0.00251 | — | — | 0.00761 | 0.00826 | 0.00954 | — |
| SURF TENSION, DYNE/CM | 18.10 | 23.31 | 30.48 | — | — | 40.07 | 55.69 | 68.52 | — |
| THEHM COND, KCAL/HR-M-C | 0.393 | 0.439 | 0.498 | — | — | 0.539 | 0.555 | 0.532 | — |
| VISCOSITY, CP | 0.120 | 0.150 | 0.210 | — | — | 0.140 | 0.254 | 0.649 | — |

| ID[1] | 52 | 54 | 60u | 60i | 60d | 70 | 74 | 74.1 | 74.2 |
|---|---|---|---|---|---|---|---|---|---|
| STREAM | STR #9 | STR #1 | STR #13 | STR #18 | STR #19 | STR #15 | STR #16 | STR #22 | STR #25 |
| PHASE | VAPOUR | LIQUID | VAP/LIQ | VAP/LIQ | LIQUID | NNF[2] | LIQUID | LIQUID | VAP/LIQ |
| TOTAL STREAM | | | | | | | | | |
| $NH_3$ Composition Rate, KG-MOL/HR | — | — | 100 | — | — | — | — | — | — |
| $H_2O$ Composition Rate, KG-MOL/HR | — | — | 92.5 | — | — | — | — | — | — |
| RATE, KG-MOL/HR | 52.04 | 140.46 | 192.50 | 192.50 | 192.50 | — | 192.50 | 125.00 | 67.50 |
| $10^3$ KG/HR | 0.887 | 2.482 | 3.369 | 3.369 | 3.369 | — | 3.369 | 2.188 | 1.182 |
| LIQ RATE @ 15.6° C., M³/HR | 1.429 | 3.005 | 4.433 | 4.433 | 4.433 | — | 4.433 | 2.879 | 1.555 |
| TEMPERATURE, C. | 35.00 | 30.94 | 69.92 | 62.38 | 35.00 | — | 35.00 | 64.92 | 95.91 |
| PRESSURE, KG/CM2 ABS | 1.85 | 1.85 | 7.50 | 7.50 | 7.50 | — | 7.50 | 13.70 | 13.70 |
| MOL WT | 17.05 | 17.67 | 17.50 | 17.50 | 17.50 | — | 17.50 | 17.50 | 17.50 |
| ENTHALPY, $10^6$ WATT | 0.3500 | 0.0926 | 0.4670 | 0.3830 | 0.1450 | — | 0.1450 | 0.1780 | 0.1830 |
| STD LIQ DENSITY, KG/M3 | 621.1 | 826.1 | 760.1 | 760.1 | 760.1 | — | 760.1 | 760.1 | 760.1 |
| SPECIFIC GRAVITY | 0.6217 | 0.8269 | 0.7608 | 0.7608 | 0.7608 | — | 0.7608 | 0.7608 | 0.7608 |
| VAPOUR | | | | | | | | | |
| RATE, KG-MOL/HR | 52.04 | — | 31.36 | 21.87 | — | — | — | — | 7.18 |
| $10^3$ KG/HR | 0.887 | — | 0.535 | 0.373 | — | — | — | — | 0.123 |
| $10^2$ M3/HR | 0.725 | — | 0.117 | 0.07935 | — | — | — | — | 0.01539 |
| VAP RATE @ 0° C. 1 ATM, $10^2$ M3/HR | 1.166 | — | 0.703 | 0.49 | — | — | — | — | 0.161 |
| SPEC GRAVITY (AIR = 1.0) | 0.589 | — | 0.589 | 0.589 | — | — | — | — | 0.589 |

TABLE 1-continued

Stream data for 0.5 MW evaporator duty

| | | | | | | | | | |
|---|---|---|---|---|---|---|---|---|---|
| MOL WT | 17.051 | — | 17.054 | 17.047 | — | — | — | — | 17.065 |
| ENTHALPY, KW-HR/KG | 0.395 | — | 0.413 | 0.405 | — | — | — | — | 0.428 |
| CP, KW-HR/KG-C | 0.000591 | — | 0.000627 | 0.000625 | — | — | — | — | 0.000658 |
| DENSITY, KG/$10^2$ M$^3$/HR | 1223.9 | — | 4585.0 | 4697.5 | — | — | — | — | 7964.0 |
| Z (FROM DENSITY) | 0.9865 | — | 0.9591 | 0.9567 | — | — | — | — | 0.9381 |
| TH COND, KCAL/HR-M-C | 0.0223 | — | 0.0259 | 0.0251 | — | — | — | — | 0.0286 |
| VISCOSITY, CP | 0.0105 | — | 0.0118 | 0.0115 | — | — | — | — | 0.0127 |
| LIQUID | | | | | | | | | |
| RATE, KG-MOL/HR | — | 140.46 | 161.14 | 170.63 | 192.50 | — | 192.50 | 125.00 | 60.32 |
| $10^3$ KG/HR | — | 2.482 | 2.835 | 2.997 | 3.369 | — | 3.369 | 2.188 | 1.059 |
| M3/HR | — | 3.068 | 3.942 | 4.17 | 4.585 | — | 4.585 | 3.172 | 1.625 |
| LIQ RATE @ 15.6° C., M$^3$/HR | — | 3.005 | 3.573 | 3.832 | 4.433 | — | 4.433 | 2.879 | 1.358 |
| SPECIFIC GRAVITY | — | 0.8269 | 0.7941 | 0.7828 | 0.7608 | — | 0.7608 | 0.7608 | 0.7804 |
| MOLECULAR WEIGHT | — | 17.671 | 17.591 | 17.562 | 17.504 | — | 17.504 | 17.504 | 17.556 |
| ENTHALPY, KW-HR/KG | — | 0.0373 | 0.0869 | 0.0774 | 0.0430 | — | 0.0430 | 0.0814 | 0.1240 |
| CP, KW-HR/KG-C | — | 0.00122 | 0.00132 | 0.00130 | 0.00125 | — | 0.00125 | 0.00133 | 0.00149 |
| DENSITY, KG/M3 | — | 809.2 | 719.2 | 718.7 | 734.9 | — | 734.9 | 689.8 | 651.5 |
| Z (FROM DENSITY) | — | 0.00157 | 0.00631 | 0.00644 | 0.00684 | — | 0.00684 | 0.01210 | 0.01180 |
| SURF TENSION, DYNE/CM | — | 53.21 | 40.96 | 40.89 | 43.36 | — | 43.36 | 37.20 | 34.03 |
| THEHM COND, KCAL/HR-M-C | — | 0.473 | 0.414 | 0.419 | 0.446 | — | 0.446 | 0.403 | 0.358 |
| VISCOSITY, CP | — | 0.473 | 0.229 | 0.242 | 0.329 | — | 0.329 | 0.214 | 0.159 |

Notes
[1]Suffix 'u', 'i', and 'd' correspond to position upstream, intermediate, or downstream of thermodynamic change points on the diagram when followed from the route of the stream
[2]NNF denotes "No Normal Flow"

The efficiency with which refrigerant absorption can be carried out in the absorption stage of an absorption refrigeration system has a significant impact on the achievable coefficient of performance of the refrigeration system. The Applicant believes that the method and the installation of the present invention, particularly the pre-absorption, absorption and absorber stages thereof, allow the present invention to achieve a higher coefficient of performance than is generally the case, particularly as, in the Applicant's experience, a higher refrigerant concentration is achievable in the refrigerant-enriched absorbent stream which is fed to the regenerator system than is the case in conventional systems.

Further the use of a compression absorption stage, preferably comprising a liquid ring pump, not only significantly increases the achievable degree of absorption of refrigerant into the absorbent, but also generates a significant amount of heat of absorption. The recovery of this heat of absorption to the regenerator system, more particularly to the regenerator column feed stream, reduces the requirement of exogenous heat to operate the regenerator column and therefore reduces the overall work or energy input requirement of the system, thereby increasing the coefficient of performance.

The installation and method of the present invention further optimises process heat utilisation by recovering waste heat from process streams, thereby further to reduce the requirement for exogenous work input to the installation, when in operation. Succinctly put, refrigerant-depleted absorbent withdrawn from the regenerator column is firstly heat exchanged with a heat transfer medium in the second heat exchanger to provide low temperature re-boil heat in the regenerator column. Secondly, the refrigerant-depleted absorbent is exchanged in the second pre-heating heat exchanger, along with refrigerant-enriched absorbent from the liquid ring pump in the second pre-heating heat exchanger against refrigerant-enriched absorbent from the refrigerant-enriched absorbent accumulation vessel, thereby to pre-heat the refrigerant-enriched absorbent prior to entering the regeneration column.

The installation and method of the present invention seeks to achieve an increase in the coefficient of performance of vapour absorption refrigeration systems. For present purposes, coefficient of performance (COP) is defined as the ratio between useful energy acquired (the cooling duty) and energy applied (energy input) More particularly, the COP can be expressed as:

$$COP = Eu/Ea$$

where
COP=coefficient of performance
Eu=useful energy acquired (btu in imperial units/kwhrs in SI units)
Ea=energy applied (btu in imperial units/kwhrs in SI units)
In relation to the description of the present invention, the COP is calculated from the enthalpy change in the streams represented in the drawing as: Eu: Streams 90 and 94 and Ea: Stream 29.

Some improvements which the present invention proposes to conventional vapour absorption refrigeration systems or operations can be summarised as follows, but are not considered as being exhaustive in relation to the present invention:

The Applicant regards the pre-saturator and the compression absorption stage as two particularly important features of the present invention. The operation of these features allow for the required circulation rate of absorbent to be reduced for a given set of constraints in the process, i.e. process operation limitations. These constraints include the available cooling medium temperature and the required refrigeration temperature.

By minimizing the absorbent circulation rate (i.e. the volume of absorbent required in conducting absorption), the load on the regenerator is reduced, which in turn reduces the required energy input to the regenerator., therefore causing an increase the COP.

The present invention seeks to achieve COP increase in two stages, firstly by contacting the vapourised refrigerant from the evaporator stage with the refrigerant-depleted absorbent from the regeneration stage in a heat exchanger cooler. As the refrigerant is absorbed into the depleted absorbent, heat of absorption is generated, which tends to heat up the absorbent/refrigerant mixture. As the temperature of the absorbent/refrigerant mixture increases, so the capacity of the absorbent to absorb more refrigerant reduces. The present invention therefore suggests extracting as much heat as possible from the absorbent/refrigerant mixture in order to achieve the lowest possible equilibrium temperature with the available cooling medium temperature. This is most effectively achieved, in the present invention, in the pre-saturator exchanger cooler, as heat is removed whilst the absorption is actually taking place. The pre-absorber is included as a type of "absorbance insurance" in case full equilibrium is not quite achieved in the pre-saturator exchanger cooler.

One objective of the abovementioned arrangement is therefore to achieve the lowest possible absorbent refrigerant mixture equilibrium temperature for a given cooling medium temperature.

The compression absorption stage, constituted preferably by the liquid ring pump, is included in order to permit contacting of the partially refrigerant-enriched absorbent with unabsorbed refrigerant at higher pressure conditions that exist in the pre-saturator and pre-absorber, thus further reducing the required absorbent circulation rate and hence the required energy input to the regenerator (due to increased absorption. Since the compression absorption stage, or liquid ring pump, requires energy to drive it, the load on the compression absorption stage must be reduced as much as possible, which is done by providing the above pre-saturator system.

The pre-saturator and compression absorption stage therefore constitute interrelated process components which are of particular significance in complementing each other and maximising absorption of refrigerant into the absorbent.

Another benefit conferred by the compression absorption stage, and particularly the liquid ring pump, is that the heat of absorption generated in this high pressure absorption stage generates a sufficiently high temperature for heat recovery of its refrigerant-enriched discharge stream against the main regenerator feed stream, thus further reducing the energy input to the regenerator by making use of process heat.

The invention therefore allows for transfer of the heat of absorption generated in the compression absorption stage to be transferred to the regenerator, thereby reducing regeneration heat demand.

It is important to note that full absorption is not typically achieved in the compression absorption stage, and that the compression absorption stage discharge would therefore typically comprise of a two phase mixture. As this discharge mixture is cooled by heat exchange against regenerator feed, further absorption takes place, thus generating additional heat of absorption which is recovered as described against regenerator feed.

Some further advantages and improvements some of which have been explained in more detail above, include:

the employment of a pre-saturator and pre-absorber in the absorption system maximises the refrigerant absorption achievable for a given cooling medium temperature;

the employment of a compression absorption system, and in particular of a liquid ring pump, further maximises achievable refrigerant absorption and allows for a reduction in required regenerator re-boil heat due to the recovery of the heat of absorption generated in the liquid ring pump.

The pre-contacter further allows temperature control of the absorption stage such that the absorption process can be maintained at its optimum by establishing a pressure for maximum absorption at the desired temperature, thereby allowing the conclusion of the absorption stage within the compression stage to achieve a level of absorption that is, to the Applicant's knowledge, not otherwise attainable in a single stage unit.

A consequence of the elevated levels of absorption is a reduced requirement for absorbent and thus commensurately lowered requirements for exogenous heat to be provided to the regenerator. The resulting "double win" delivers a marked increase in process efficiency when compared to conventional systems of which the Applicant is aware.

The Applicant has found that the method and installation of the present invention achieves a coefficient of performance of around 1 with a regenerator operating at a pressure of about 13.5 bar (absolute), a regenerator overhead (recovered vapourised refrigerant) temperature of about 35° C. and an evaporator operating temperature of about −18° C.

The Applicant also believes that the method and installation of the invention would be useful in exploiting as vapour absorption refrigeration heat source, heat sources that are not generally useful in generating refrigeration.

The Applicant regards the present invention as being particularly advantageous over existing systems that attempt to achieve increased COP. Typical other absorption refrigeration systems include "single effect cycle"-systems that involve the transfer of fluid through the four major components of a refrigeration system evaporator, absorber, generator and condenser. "Double effect cycle" systems have two condensers and two generators to allow for more refrigerant boil-off from the absorption solution. "Triple effect cycle systems" involve a logical improvement over the "double-effect cycle" systems and typically include a low-temperature condenser, a middle-temperature condenser, a high-temperature condenser, a middle-temperature generator, a low-temperature generator and an absorber."

The invention claimed is:

1. A method of carrying out vapour absorption refrigeration, the method including in a condensing stage, condensing a refrigerant in vapour form to obtain condensed or liquefied refrigerant;

passing this liquefied refrigerant into an expansion/evaporation stage;

in the expansion/evaporation stage, subjecting the refrigerant to heat transfer with a higher temperature medium such that heat is transferred from the higher temperature medium to the refrigeration temperature and the refrigerant being heated such that at least some of the liquefied refrigerant is evaporated, thereby to obtain vapourised refrigerant;

passing the vapourised refrigerant from the evaporation stage into an absorption stage;

absorbing, in the absorption stage, some of the vapourised refrigerant into an absorbent at a first pressure, thereby to obtain partially refrigerant-enriched absorbent and residual vapourised refrigerant;

in a compression absorption stage, comprising a compressor having a suction side and a discharge, pressure side, passing the partially refrigerant-enriched absorbent and the residual vapourised refrigerant to the suction side of the compressor and contacting, by means of the compressor, the partially refrigerant-enriched absorbent and residual vapourised refrigerant under compression, at a second pressure that is greater than the first pressure, thereby obtaining refrigerant-enriched absorbent that is withdrawn, or discharged, from the discharge, pressure side of the compressor, with the compressor having increased the pressure of the partially refrigerant-enriched absorbent and residual vapourised refrigerant and with residual vapourised refrigerant consequently having been absorbed into the partially refrigerant-enriched absorbent;

passing refrigerant-enriched absorbent from the compression absorption stage into a refrigerant regeneration stage;

in the regeneration stage, recovering refrigerant, in vapour form, from the refrigerant-enriched absorbent thereby to obtain refrigerant-depleted absorbent;

recycling recovered vapourised refrigerant from the regeneration stage to the condensing stage; and recycling refrigerant-depleted absorbent from the regeneration stage to the absorption stage with the recycled refrigerant-depleted absorbent constituting the absorbent in the absorption stage, wherein the absorption stage includes contacting, in a pre-contacting stage, vapourised refrigerant with the refrigerant-depleted absorbent to obtain partially refrigerant-saturated absorbent; and contacting, in a main contacting stage, vapourised refrigerant with the partially refrigerant-saturated absorbent, thereby to obtain the partially refrigerant-enriched absorbent that is passed to the compressor in the compression absorption stage, with the pre-contacting stage being a pre-saturation stage and the main contacting stage being a pre-absorption stage and with absorbing the vapourised refrigerant into the refrigerant-depleted absorbent in the absorption stage including passing vapourised refrigerant from the evaporation stage into the pre-absorption stage;

in the pre-absorption stage, absorbing vapourised refrigerant from the evaporation stage into an absorption liquid from the pre-saturation stage, thereby to obtain the partially refrigerant-enriched absorbent that is passed to the compressor in the compression absorption stage;

withdrawing unabsorbed vapourised refrigerant from the evaporation stage and passing it into the pre-saturation stage together with the refrigerant-depleted absorbent from the regeneration stage, with the refrigerant-depleted absorbent thus being pre-contacted and partially saturated with the unabsorbed vapourised refrigerant in the pre-saturation stage, thereby to obtain the partially refrigerant-saturated absorbent and also to obtain the residual vapourised refrigerant that is passed to the compressor in the compression absorption stage; and withdrawing the partially refrigerant-saturated absorbent from the pre-saturation stage and passing it into the pre-absorption stage so that it constitutes the absorption liquid in the pre-absorption stage.

2. The method according to claim 1, wherein the pre-saturation stage and the pre-absorption stage are operated at a pressure, being the first pressure, of between about 1.3 bar (abs) and about 4.5 bar (abs).

3. The method according to claim 1, wherein contacting the refrigerant-depleted absorbent with the unabsorbed vapourised refrigerant in the pre-saturation stage includes subjecting the so contacted refrigerant-depleted absorbent and unabsorbed vapourised refrigerant to cooling heat transfer.

4. The method according to claim 3, wherein the contacting of the refrigerant-depleted absorbent with the unabsorbed vapourised refrigerant and subjecting of the so contacted refrigerant-depleted absorbent and unabsorbed vapourised refrigerant to cooling heat transfer is effected simultaneously such that simultaneous mass transfer of unabsorbed vapourised refrigerant to refrigerant-depleted absorbent, and cooling heat transfer occurs.

5. The method according the claim 1, wherein the compressor is a liquid ring pump, with the partially refrigerant-enriched absorbent and the residual vapourised refrigerant thus being passed to the suction side of the liquid ring pump and with the refrigerant enriched absorbent being withdrawn from the discharge, pressure side of the liquid ring pump.

6. The method according to claim 1, wherein the second pressure is between about 3.5 bar (abs) and about 10 bar (abs).

7. The method according to claim 1, wherein the refrigerant is ammonia and the absorbent is water.

8. An absorption refrigeration installation which includes a condenser in which a refrigerant in vapour form can be condensed, to obtain a condensed or liquefied refrigerant;

an expander/evaporator stage in which the refrigerant can be subjected to heat transfer with a higher temperature medium such that energy in the form of heat is transferred from the higher temperature medium to the refrigerant, with the higher temperature medium being cooled or refrigerated to a desired refrigeration temperature and the refrigerant being vapourised, with a condensed refrigerant transfer line leading from the condenser to the expander/evaporator stage;

an absorption stage in which some of the vapourised refrigerant can be absorbed, at a first pressure, into an absorbent to obtain a partially refrigerant-enriched absorbent, with a vapourised refrigerant transfer line leading from the evaporator stage into the absorption stage, the absorption stage comprising a pre-contacting stage in which refrigerant-depleted absorbent can be pre-contacted with vapourised refrigerant to obtain a partially refrigerant-saturated absorbent; and a main contacting stage in which the partially refrigerant-saturated absorbent can be contacted with vapourised refrigerant to obtain a partially refrigerant-enriched absorbent, wherein the main contacting stage is a pre-absorber and the pre-contacting stage is a pre-saturator, with the absorption stage thus including the pre-absorber to which vapourised refrigerant can be fed from the evaporator along the vapourised refrigerant transfer line and in which the vapourised refrigerant can be contacted with an absorption liquid from the pre-saturator into which it can be absorbed to obtain the partially refrigerant-enriched absorbent, with an absorption liquid transfer line leading from the pre-saturator into the pre-absorber;

the pre-saturator to which refrigerant-depleted absorbent can be fed from the regenerator along the refrigerant-depleted absorbent transfer line and in which it can be contacted with unabsorbed vapourised refrigerant from the pre-absorption stage, thereby to pre-saturate the refrigerant-depleted absorbent and obtain the partially refrigerant-saturated absorbent that can be passed to the pre-absorber along the absorption liquid transfer line to constitute the absorption liquid in the pre-absorber, with an unabsorbed vapourised refrigerant transfer line leading from the pre-absorber to the pre-saturator;

a compression absorption stage comprising a compressor having a suction side to which the partially refrigerant-enriched absorbent from the pre-absorber and residual vapourised refrigerant from the pre-saturator can be fed respectively along a partially refrigerant-enriched absorbent transfer line and a residual vapourised refrigerant transfer line and being capable of increasing the pressure of the partially refrigerant-enriched absorbent and residual vapourised refrigerant thereby to contact the partially refrigerant-enriched absorbent and residual vapourised refrigerant under compression, consequently to absorb residual vapourised refrigerant into the partially refrigerant-enriched absorbent at a second pressure that is greater than the first pressure and obtain refrigerant-enriched absorbent, with the compressor further having a discharge, pressure side from which the refrigerant-enriched absorbent can be withdrawn;

a regenerator stage in which refrigerant can be recovered, in vapour form, from the refrigerant-enriched absorbent thereby to obtain a refrigerant-depleted absorbent, with a refrigerant-enriched absorbent transfer line leading into the regenerator stage;

a recovered vapourised refrigerant transfer line leading from the regenerator stage to the condenser and along which recovered refrigerant can be withdrawn from the regenerator and passed to the condenser; and a refrigerant-depleted absorbent transfer line leading from the regenerator and along which refrigerant-depleted absorbent can be withdrawn from the regenerator, with this transfer line leading into the absorption stage so that the refrigerant-depleted absorbent constitutes the absorbent in the absorption stage.

9. The installation according to claim 8, wherein the pre-saturator includes a pre-saturator flash vessel in which the contacting of the unabsorbed vapourised refrigerant and the refrigerant-depleted absorbent is, at least in part, effected.

10. The installation according to claim 9, wherein the pre-saturator includes a pre-saturator heat exchanger to which refrigerant-depleted absorbent and unabsorbed vapourised refrigerant are fed such that they are contacted with each other in the heat exchanger, the pre-saturator heat exchanger being capable of providing cooling heat transfer for removal of the heat of absorption arising from the absorption of the unabsorbed vapourised refrigerant into the refrigerant-depleted absorbent.

11. The installation according to claim 10, wherein the pre-saturator flash vessel is provided downstream from the pre-saturator heat exchanger.

12. The installation according to claim 8, wherein the compressor comprises a liquid ring pump.

13. The installation according to claim 8, wherein the refrigerant is ammonia and the absorbent is water.

* * * * *